(12) United States Patent
Robert Jose et al.

(10) Patent No.: US 11,626,103 B2
(45) Date of Patent: Apr. 11, 2023

(54) METHODS FOR NATURAL LANGUAGE MODEL TRAINING IN NATURAL LANGUAGE UNDERSTANDING (NLU) SYSTEMS

(71) Applicant: Rovi Guides, Inc., San Jose, CA (US)

(72) Inventors: Jeffry Copps Robert Jose, Tamil Nadu (IN); Mithun Umesh, Bangalore (IN)

(73) Assignee: Rovi Guides, Inc., San Jose, CA (US)

( * ) Notice: Subject to any disclaimer, the term of this patent is extended or adjusted under 35 U.S.C. 154(b) by 258 days.

(21) Appl. No.: 16/805,342

(22) Filed: Feb. 28, 2020

(65) Prior Publication Data

US 2021/0272554 A1    Sep. 2, 2021

(51) Int. Cl.

| | |
|---|---|
| *G10L 15/06* | (2013.01) |
| *G10L 15/18* | (2013.01) |
| *G10L 15/16* | (2006.01) |
| *G10L 15/14* | (2006.01) |
| *G10L 15/26* | (2006.01) |
| *G06F 16/23* | (2019.01) |
| *G06F 16/9032* | (2019.01) |

(52) U.S. Cl.
CPC ............ *G10L 15/063* (2013.01); *G06F 16/23* (2019.01); *G06F 16/90332* (2019.01); *G10L 15/142* (2013.01); *G10L 15/16* (2013.01); *G10L 15/18* (2013.01); *G10L 15/26* (2013.01)

(58) Field of Classification Search
CPC ....... G10L 15/06; G10L 15/142; G10L 15/16; G10L 15/18; G10L 15/26; G10L 15/063; G06F 16/23; G06F 16/90332
See application file for complete search history.

(56) References Cited

U.S. PATENT DOCUMENTS

| | | |
|---|---|---|
| 11,055,355 B1 | 7/2021 | Monti et al. |
| 11,392,771 B2 | 7/2022 | Robert Jose |
| 11,393,455 B2 | 7/2022 | Robert Jose |
| 11,457,288 B1 | 9/2022 | Gupta et al. |

(Continued)

OTHER PUBLICATIONS

International Search Report and Written Opinion of PCT/US2020/066821 dated Apr. 16, 2021.

(Continued)

*Primary Examiner* — Sonia L Gay
(74) *Attorney, Agent, or Firm* — Haley Guiliano LLP

(57) ABSTRACT

Systems and methods for determining to perform an action of a query using a trained natural language model of a natural language understanding (NLU) system are disclosed herein. A text string corresponding to a prescribed action includes at least a content entity is received. A determination is made as to whether the text string corresponds to an audio input of a first group. In response to determining the text string corresponds to an audio input of a first group, a determination is made as to whether the text string includes an obsequious expression. In response to determining the text string corresponds to an audio input of a first group and in response to determining the text string includes an obsequious expression, a determination is made to perform the prescribed action. In response to determining the text string corresponds to an audio input of a first group and in response to determining the text string does not include the obsequious expression, a determination is made to not perform the prescribed action.

20 Claims, 11 Drawing Sheets

(56) References Cited

U.S. PATENT DOCUMENTS

| | | | |
|---|---|---|---|
| 2005/0159954 A1 | 7/2005 | Chu et al. | |
| 2010/0180199 A1* | 7/2010 | Wu | G06F 40/295 715/259 |
| 2013/0238318 A1 | 9/2013 | Enoki et al. | |
| 2017/0236512 A1* | 8/2017 | Williams | H04R 3/12 381/79 |
| 2019/0236130 A1* | 8/2019 | Li | G06N 3/0427 |
| 2019/0303393 A1* | 10/2019 | Hung | G06F 16/90332 |
| 2019/0378515 A1 | 12/2019 | Kim et al. | |
| 2020/0075024 A1* | 3/2020 | Wang | G10L 17/06 |
| 2020/0294499 A1* | 9/2020 | DeLuca | G06N 5/025 |
| 2020/0380077 A1 | 12/2020 | Ge et al. | |
| 2020/0380991 A1 | 12/2020 | Ge et al. | |
| 2021/0217423 A1 | 7/2021 | Rakshit | |
| 2021/0271816 A1 | 9/2021 | Robert Jose et al. | |
| 2021/0271819 A1 | 9/2021 | Robert Jose et al. | |
| 2021/0272553 A1 | 9/2021 | Robert Jose et al. | |

OTHER PUBLICATIONS

Anonymous: "obsequious, adj.", Oxford English Dictionary, Mar. 1, 2004, pp. 1-2, XP055792734, Oxford, Oxon, UK, Retrieved from the Internet: URL:https://oed.com/view/Entry/129863?redirectedFrom=obsequious&print [retrieved on Apr. 6, 2021].

Bonfert Michael, et al., "If You Ask Nicely", , International Conference on Multimodal Interaction, ACM, 2 Penn Plaza, Suite 701, New York, NY 10121-0701 USA Oct. 2, 2018, pp. 95-102, XP058416007.

Deselaers Thomas, "Polite mode for a virtual assistant", Technical Disclosure Commons Defensive Publications Series, Feb. 21, 2018, XP055793441 Retrieved from the Internet: URL:https://www.tdcommons.org/cgi/viewcontent.cgi?article=2129&context=dpubs_series [retrieved on Apr. 8, 2021].

Selma Yilmazyildiz Kayaarma, et al., "Politeness Detection in Speech for Human-Computer Interaction", Jan. 1, 2019, XP055793426, Retrieved from the Internet: URL:http://ceur-ws.org/Vol-2491/demo95.pdf [retrieved on Apr. 8, 2021].

Platz Cheryl, "Pretty Please, Alexa", medium.com, Dec. 13, 2017, XP055793422, Retrieved from the Internet: URL:https://medium.com/s/story/pretty-plea se-politeness-in-voice-user-interfaces-95ebfc89ba0f [retrieved on Apr. 8, 2021].

U.S. Appl. No. 16/805,307, filed Feb. 28, 2020, Jeffry Copps Robert Jose.

U.S. Appl. No. 16/805,335, filed Feb. 28, 2020, Jeffry Copps Robert Jose.

U.S. Appl. No. 16/805,358, filed Feb. 28, 2020, Jeffry Copps Robert Jose.

* cited by examiner

METHODS FOR NATURAL LANGUAGE MODEL TRAINING IN NATURAL LANGUAGE UNDERSTANDING (NLU) SYSTEMS

BACKGROUND

The present disclosure relates to natural language model training systems and methods and, more particularly, to systems and methods related to training and employing natural language models in natural language understanding (NLU) systems operations.

SUMMARY

No doubt, voice-controlled human machine interfaces have gained notoriety among avid electronic device users. Learning to recognize and process speech, however, is not an easy feat for these interface devices. Large data sets serve as training input to speech recognition models to facilitate reliable speech recognition capability over time, oftentimes over a long time. Generally, the larger the training data set and the longer the training, the more reliable the recognized speech. Correspondingly, text string recognition capability shares similar reliability characteristics. Voice and/or text string recognition technology for certain applications remain in their infancy with improvements yet to be realized. Regardless of the training size or training duration, speech and text recognition suffer from inaccuracies when provided with inputs of inadequate clarity and volume. A soft-spoken voice often falls victim to misinterpretation or no interpretation by a device having voice interface capabilities. Take the case of a 6-year old child for example. Speaking to a device, located 10 or 20 feet away, the 6-year old is unlikely to speak with requisite voice strength and speech clarity for proper speech or text recognition functionality. Unless spoken with clarity and particularly strength of volume, a device using voice input does not and cannot carry out the child's commands, for example. Children are naturally made to speak louder to properly convey their wishes, an outcome that is not without consequence. Habits generally start to take form at an early age, and current voice-recognition technology albeit unintentionally is teaching kids to learn to behave rudely and obnoxiously by loudly voicing a command.

Voice-recognition technology manufacturers have attempted to address the foregoing issue by requiring devices with voice interfaces to conform to polite speech, for example, "thank you" or "please" preceding or following a command, such as "change channels" or "play Barney". In some cases, the device will simply refuse to carry out the command in the absence of detecting an obsequious expression. The Amazon's Echo device, Amazon Fire TV, Amazon Fire Stick, Apple TV, Android mobile devices with Google's "Ok Google" application and the iPhone with Siri serve as examples of devices with voice interface functionality. Some devices go as far as responding to an impolite input query only to remind the user to repeat the command using polite words and not until a polite command follows will the device indeed carry out the command. In response to "play Barney", for example, the device prevents the show Barney from playing until an alteration of the command is received using an obsequious expression, i.e. "play Barney, please". Such advancements are certainly notable but other issues remain.

Natural language voice recognition systems, such as natural language understanding (NLU) systems, require user utterance training for proper utterance matching in addition to user query recognition and interpretation functionalities. Adding an obsequious expression to a user query as a prefix or a suffix, such as "please" at the end of "play Game of Thrones", presents challenges to voice-recognition model training. One such challenge is a reduction in match scores of previously trained speeches (or queries). Simply put, in the presence of an obsequious expression, the model fails to recognize an utterance with an equivalent degree of accuracy as its predecessors. Consequently, additional costly and lengthy training techniques may be required. Further, system architecture is made unnecessarily complicated to accommodate additional natural language model training for text strings or speech that include obsequious expressions. Finally, removing obsequious expressions from search queries, while a seemingly viable solution, poses a problem relative to content search applications with entity titles that include such expressions, because removing the expressions from the query yields poor results. For example, the movie title, "Play Thank You for Smoking", may be reduced to "Play>entity_title <you for smoking>", which would yield incorrect results. Some of the examples presented in this disclosure are directed to determinations for including, or not, obsequious expressions, however, it is understood that some embodiments of the disclosure may be used for ease of training a model to understand expressions, other than obsequious expressions. In some embodiments, suitable expressions for the purpose of training a model, for example, help to decrease the functionality of the NLU system, are contemplated.

To overcome the preceding limitations, the present disclosure describes a natural language model-based voice recognition system that facilitates speech recognition with reduced model training sets while meeting the precision certainty of legacy voice recognition systems. Model training is implemented with minimal system architecture alterations to promote plug-and-play modularity, a design convenience.

In disclosed embodiments and methods, a natural language model of a natural language understanding (NLU) (also referred to as "natural language processing (NLP)") system is minimally trained and conveniently adaptable for legacy system compatibility. The model can be made to operate with existing natural language-based voice recognition systems, it requires a mere design-convenient plug-and-play implementation. In some embodiments, the model facilitates a simple binary prediction classification, trained to recognize a query with an obsequious expression and a query without an obsequious expression, for example.

In some embodiments, a query is generated using a trained natural language model in an NLU system. The query is tested to include an obsequious expression, or not. In some embodiments, a query may contain a user prescribed action and the model is trained to determine to perform the prescribed action, or not. In some embodiments, the model is trained to recognize child-spoken speech or correspondingly text string generated from child-spoken speech.

In some embodiments, the NLU system is pre-processing (or pre-training) assisted. A classifier binary model implements a simple classification prediction to generate queries for the NLU system. In some embodiments, the classifier binary model facilitates query generation. For example, the model may be trained with command text string queries or non-command text string queries, "play Game of Thrones" or "thank you for smoking", respectively. In operation, the trained model facilitates text string query recognition by offering pre-processing assistance to a natural language understanding processor for sentence recognition, for example.

The query text string may include one or more content entities. In some embodiments, the text string may correspond to user originated speech (or audio), and the content entity may correspond to a command. For example, a voice command may be transcribed into a text string: "Play Barney" or "Show me the Game of Thrones". The system determines whether the text string includes an obsequious expression, for example, does the text string "Play Barney" include the term "please", or does the text string "Play Barney, please!" include the term "please"?

In some embodiments, the system may make a contextual determination of the obsequious expression. In this connection, the binary model may be trained to recognize contextualized natural language. In some embodiments, in response to an obsequious expression descriptor determination, the system may treat the obsequious expression as a part of the text string. For example, the string "Thank you for smoking!" includes the obsequious term, "thank you", yet the system determines the term is an unintended obsequious expression (a title of a movie), one that describes the remainder of the text string, "for smoking!".

In some embodiments, in response to determining whether the text string includes an obsequious expression during pre-processing, the system determines to forward the query to the remaining components of the NLU system, such as a NLU processor, based on a determination as to whether the obsequious expression describes the content entity. In response to determining the obsequious expression describes the content entity, the query may be forwarded with the obsequious expression and in response to determining the obsequious expression does not describe the content entity, the query may be forwarded without the obsequious expression. In this manner, the input to a subsequent natural language recognition processor are matched against known elements and legacy match scores remain unchanged.

In some embodiments, in response to receiving a text string with a content entity, a determination is made regarding the text string. If the determination yields the text string includes an obsequious expression, the system further determines whether the obsequious expression describes the query content entity. In response to determining the obsequious expression describes the content entity, the query is generated with the content entity and the obsequious expression and in response to determining the obsequious expression does not describe the content entity, the query is generated with the content entity but without the obsequious expression. For example, the text string "play Game of Thrones" is tested for including an obsequious expression (e.g., "please" or "thank you"). If the text string is determined to include an obsequious expression but the obsequious expression is contextually not an intended obsequious word or expression (e.g., "thank you for smoking", the title of a movie), the query is generated with the obsequious expression and if the text string includes an obsequious expression and the obsequious expression is intentional, i.e. intentional use of a polite word or expression, the query is generated without the obsequious expression to maintain query prediction integrity (legacy match scores). As referenced herein, an "expression" is synonymous with a "term" or one or more "words". For example, an "obsequious expression" is synonymous with "obsequious term", and "obsequious word(s)".

The binary model may be trained with obsequious expressions or without obsequious expressions. For example, in cases where an obsequious expression is detected and the detected obsequious expression does not describe the content entity, the binary model may be trained with a presence of an obsequious expression or with the absence of an obsequious expression. Correspondingly, in cases where an obsequious expression is detected and the detected obsequious expression does describe the content entity, the binary model may be trained with a presence of an obsequious expression or with the absence of an obsequious expression. As used herein, detecting or determining the presence of an entity correspondingly applies to detecting or determining the absence of the entity. For example, reference to detecting or determining the presence of an obsequious expression correspondingly applies to detecting or determining the absence of the obsequious expression and reference to detecting or determining an obsequious expression describing a content entity correspondingly applies to detecting or determining the absence of the obsequious expression describing the obsequious expression.

Noted earlier, in some embodiments, a determination is made to perform an action prescribed in the query using the trained binary model. The query is received with a content entity including a text string prescribing the action. In the above-noted embodiments and methods, the text string corresponds to an audio (or voice) input but in the case of determining to perform an action, or not, the system may make an additional determination relating to the audio input—the system may determine whether the query text string corresponds to an audio input from a categorized group based on the input spectral characteristics and audio features. A group may be categorized (or classified) as an adult, child, or unknown group, or based on other suitable grouping classifications including, without limitation, demographic or geographic. In response to determining the text string corresponds to an audio input from a group categorized as a "child", for example, the system further determines whether the text string includes an obsequious expression. In the case of determining the presence of an obsequious expression in the text string and detecting a child voice, the system determines to perform the action and in the case of determining the absence of an obsequious expression in the text string and detecting a child voice, the system determines to not perform the prescribed action. For example, if the system detects the text string "play Barney" from a child voice, the system determines to not play Barney and if the system detects the text string "play Barney, please" from a child voice, the system determines to play Barney.

In the case of determining the presence of an obsequious expression in the text string and detecting a child voice, the system may further determine whether the obsequious expression describes the content entity. In the case of determining the presence of an obsequious expression in the text string, detecting a child voice, and determining the obsequious expression does not describe the content entity, the system determines to perform the action. In the case of determining the absence of an obsequious expression in the text string and detecting a child voice and determining the obsequious expression does not describe the content entity, the system determines to not perform the prescribed action.

BRIEF DESCRIPTION OF THE DRAWINGS

The above and other objects and advantages of the disclosure will be apparent upon consideration of the following detailed description, taken in conjunction with the accompanying drawings, in which.

DETAILED DESCRIPTION

Figure 1:
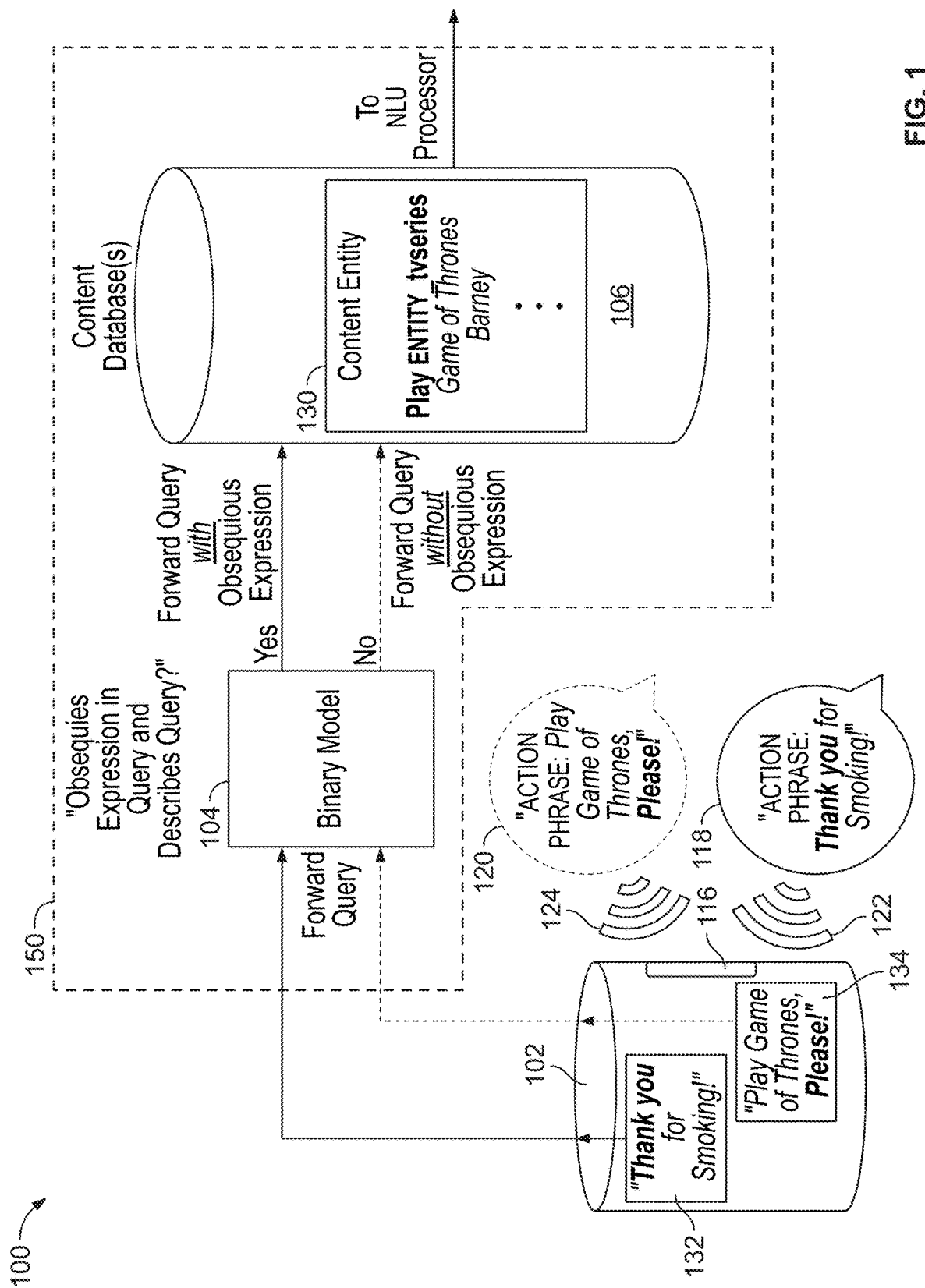
FIGS. 1-4 are illustrative examples of natural language understanding (NLU) systems, in accordance with some disclosed embodiments of the disclosure.

FIG. 1 illustrates a natural language understanding (NLU) system, in accordance with various disclosed embodiments and methods. In FIG. 1, a natural language understanding (NLU) system is configured as a natural language understanding (NLU) system 100, in accordance with various disclosed embodiments and methods. NLU system 100 may implement query generation and natural language model training features. NLU system 100 may alternatively or additionally implement prescribed action query determination and query response features.

In FIG. 1, NLU system 100 is shown to include a device 102, in accordance with various disclosed embodiments and methods. In some embodiments, device 102 comprises voice control capabilities. Device 102 may include, as shown in the embodiment of FIG. 1, a classifier binary model 104, and a content database 106, in accordance with disclosed embodiments. Classifier binary model 104 and content database 106 collectively comprise a natural language model training pre-processing unit (or "pre-training unit") 150. In some embodiments, device 102 may join the collection as a part of the pre-processing unit 150. In embodiments with part or all of the relevant functions of classifier binary model 104, device 102, or a combination performed by network elements of a communication network (e.g., a network cloud), as will be further discussed below, pre-processing unit 150 may comprise at least part of the communication network elements performing the relevant pre-processing functions. For example, pre-processing unit 150 may include components or combinations of components performing each of processes 500 through 800 of FIGS. 5-8, respectively.

Pre-processing unit (or pre-training unit) 150 assists in natural language model training and facilitates natural language model training operations. In some embodiments, pre-processing unit 150 generates a query to assist with simplifying natural language model training. In some embodiments, pre-processing unit 150 assists with determining to perform certain functions and operation, such as, without limitation, a prescribed action, using the natural language model. In the embodiments of FIGS. 1-4, corresponding pre-processing unit outcomes are provided to an NLU processor, such as, without limitation, an NLU processor of FIG. 10, for natural language model training.

In some embodiments, content database 106 may manage stored content entities of a content entity data structure 130. A content entity data structure, such as but not limited to content entity data structure 130, may include one or more content entities.

In FIG. 1, content database 106 is shown to include a single content entity data structure but it is understood that more than one content entity may be housed and managed by content database 106. A content entity is a grouped content based on a common type or a common category—an entity. For example, in the presented content entity of content entity data structure 130, entities "Game of Thrones" and "Barney" share a common category of tvseries, content media candidates of a media device. Stated differently, content is tagged by content entity in content entity data structure 130 based on, for example, content entity type, Play ENTITY_tvseries. Nonlimiting examples of entities of the content entity Play ENTITY_tvseries are television series, "The Big Bang Theory" (not shown in FIG. 1), "Game of Thrones" (shown in FIG. 1) and "Barney" (shown in FIG. 1).

Device 102 receives voice (or speech) input 118 and generates a responsive query for transmission to classifier binary model 104. For example, a user queries device 102, for a media content (e.g., Game of Thrones), and the electronic device provides the media content that best matches the user's query. Device 102 may be responsive to more than one voice input, such as voice input 120. In practical applications, device 102 is generally responsive to many voice inputs.

As referred to herein, the term "media content" and "content" should be understood to mean an electronically consumable content by a user, such as online games, virtual content, augmented or mixed reality content, direct-to-consumer live streaming, virtual reality chat applications, virtual reality video plays, 360 video content, a television or video program, internet content (e.g., streaming content, downloadable content, webcasts, . . . ), video clips, audio, content information, pictures, images, documents, playlists, websites, articles, e-books, blogs, chat sessions, social media, applications, games, and/or any other media or multimedia and/or combination thereof.

Device 102 implements a speech-to-text transcription to convert voice input to a text string for natural language model training and natural language model operation applications. Device 102 may implement automatic speech recognition (ASR) to facilitate speech-to-text transcription. In the example of FIG. 1, device 102 transcribes voice input 118 to text string 132 and transcribes voice input 120 to text string 134.

Transcription of voice input 118 or 120 may be achieved by external transcription services. In a nonlimiting example, in response to receiving voice input 118 or voice input 120, at a receiver 116, device 102 transmits the received voice input to an external ASR service for speech-to-text transcription and in response, receives text strings 132 and 134, respectively. Nonlimiting examples of ASR services are Amazon Transcribe by Amazon, Inc. of Seattle, Wash. and Google Speech-to-Text by Google, Inc. of Mountain View, Calif.

Device 102 implements a contextual voice recognition feature for natural language construct of text strings from voice input 118 or voice input 120. Device 102 may determine whether a part of a text string describes the remainder or a remaining portion of the text string. For example, an obsequious expression, such as "thank you" in text string 132 may actually describe, relate to or associate with the remainder of the text string "for smoking" and not intended as an obsequious expression, the content entity. In nonlimiting examples, device 102 may employ vector quantization (VQ) techniques employing its distinct codebook or based on a single universal (common) VQ codebook and its occurrence probability histograms natural language recognition techniques and algorithms. In some embodiments, rule-based language processing techniques may be employed. In some embodiments, statistical natural language processing techniques may be employed. In some natural language recognition models, grammar induction and grammar inference algorithms, such as context-free Lempel-Ziv-Welch algorithm or byte-pair encoding and optimization, may be employed. Lemmatization tasks may be employed to remove inflectional endings, morphological segmentation may be performed to separate words into individual morphemes and identify the class of morphemes, part-of-speech tagging, parsing, sentence boundary disambiguation, stemming, word segmentation, terminology extraction, and other suitable natural language recognition techniques. In example embodiments, natural language recognition processes may be implemented with speech recognition algorithms such as hidden Markov model, dynamic time warping, and artificial neural networks may be employed.

In some embodiments, each of the components shown in FIG. 1 may be implemented in hardware or software. For example, classifier binary model 104 may be implemented in hardware or software. In cases implementing classifier binary model 104 in software, a set of program instructions may be executed and when executed by a processor cause binary model 104 to perform functions and processes as those disclosed herein. Similarly, device 102 may be implemented in hardware or software, and in the latter case, such as by a set of program instructions that when executed by a processor cause device 102 to perform functions and processes as those disclosed herein. Content database 106 may also be implemented in hardware or software, and in the latter case, such as by a set of program instructions that when executed by a processor cause content database 106 to perform functions and processes, such as those disclosed herein. In some embodiments, processing circuitry 1140 of control circuitry 1128 of a computing device 1118 or processing circuitry 1126 of control circuitry 1120 of a server 1102 (FIG. 11) may execute program instructions to implement functionality of classifier binary model 104, device 102, content database 106, or a combination. In an example application, processing circuitry 1040 may execute program instructions stored in a storage 1138 and processing circuitry 1126 may execute program instructions stored in a storage 1124.

In some embodiments, device 102 is an electronic voice recognition (or voice-assisted) device that may be responsive to user voice commands, such as voice input 118 and 120. Device 102 receives voice input in the form of audio or digital signals (or audio or digital input). In some embodiments, device 102 receives voice input at receiver 116. In some embodiments, device 102 recognizes voice input only when prefaced with an expected phrase such as an action phrase. For example, device 102 may be an Amazon Echo or a Google Home device that recognizes user voice commands such as "Play Game of Thrones" or "Thank you for smoking!" when the user voice commands are prefaced with distinct and known action phrases, "Alexa" or "Ok, Google", respectively. In a practical example, a user may utter "Alexa, Play Game of Thrones" or "Ok, Google, Play Game of Thrones" based on the manufacturer design of the device. Voice-assisted input 102 may be responsive to an action phrase other than "Ok, Google", "Siri", "Bixby" or "Alexa,". In some embodiments, device 102 may recognize voice input with other forms of or other placement (in the text string) of suitable natural language expressions.

In some embodiments, device 102 may be responsive to command voice input, such as "Play Game of Thrones", and in some embodiments, device 102 may be responsive to non-command voice input, such as "Thank you for smoking!". In some embodiments, device 102 is a stand-alone device and in some embodiments, device 102 is integrated or incorporated into a host device or system. In nonlimiting examples, device 102 may be a part of a computer host system, a smartphone host, or a tablet host.

Device 102 may receive voice input 118 or 120 by wire or wireless transmission. In a wireless transmission example, as shown in FIG. 1, device 102 receives voice input 118 and 120 via transmissions 122 and 124, respectively. As previously noted, device 102 may receive input 118 or 120 at receiver 116. In some embodiments, receiver 116 may be a microphone communicatively coupled to device 102 through wire or wireless communication coupling. In some embodiments, receiver 116 is integral to device 102, as shown in FIG. 1, and in some embodiments, receiver 116 resides externally to device 102.

Device 102 may be incorporated into a communication network. For example, device 102 may be part of a private or public cloud network system, housed in a network element, such as a network server. In some embodiments, device 102 is communicatively coupled to classifier binary model 104 through a communication network, the communication network may receive queries from device 102 and transmit the received queries to classifier binary model 104. In a direct communication coupling embodiment between device 102 and classifier binary model 104, as shown in FIG. 1, classifier binary model 104 and device 102 may communicate through wire or wirelessly. In some embodiments, binary model 104 is integrated into device 102 and in some communication network-based embodiments, binary model 104 may be a part of a network element in the communication network.

Content database 106 may be made of one or more database instances directly or indirectly communicatively coupled to one another. In some embodiments, content database 106 is a SQL-based (relational) database and in some embodiments, content database 106 is a NoSQL-based, (non-relational) database.

In some embodiments, classifier binary model 104 implements binary classification techniques to assist with NLU pre-processing operations and modeling to achieve a simple, plug-and-play and cost-effective NLU system architecture. For example, classifier binary model 104 assists in implementing a reduced training set to facilitate minimal NLU system architecture change and promote plug-and-play modularity. In some embodiments, classifier binary model 104 may be a binary classifier (also known as a "binomial classifier") predicting between two groups (or classifications) on the basis of a classification rule. The classifier binary models of example embodiments shown in FIGS. 1-4, may discriminate between two groups of queries. By way of example, binary model 104 of FIG. 1 may implement a query group classification based on a query classification rule with queries that include an obsequious expression and another query group classification with queries that do not include an obsequious expression. In another example, binary model 104, in accordance with an action classification rule, may classify queries into a query group with prescribed actions to be performed and a query group with prescribed actions not to be performed.

In some embodiments, classifier binary model 104 is trained with an N-number of queries, "N" being an integer value. For example, classifier binary model 104 may be trained with N number of a combination of command queries, and non-command queries. Generally, the greater the number of training queries, N, the more reliably the classification may be applied during operation of system 100.

Figure 5:
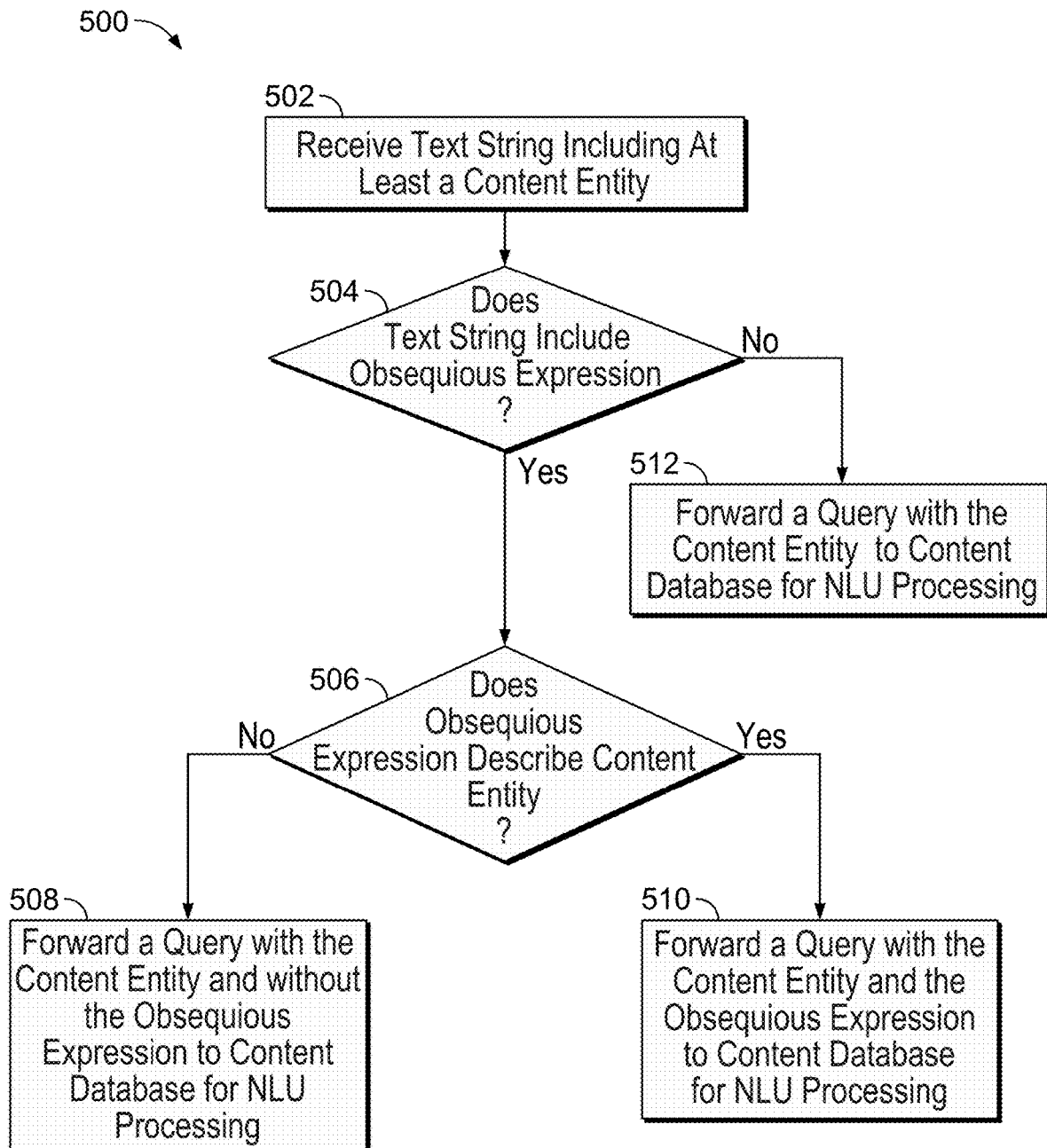
FIGS. 5-9 depict illustrative flowcharts of query generation and determination processes, in accordance with some embodiments of the disclosure.
Figure 6:
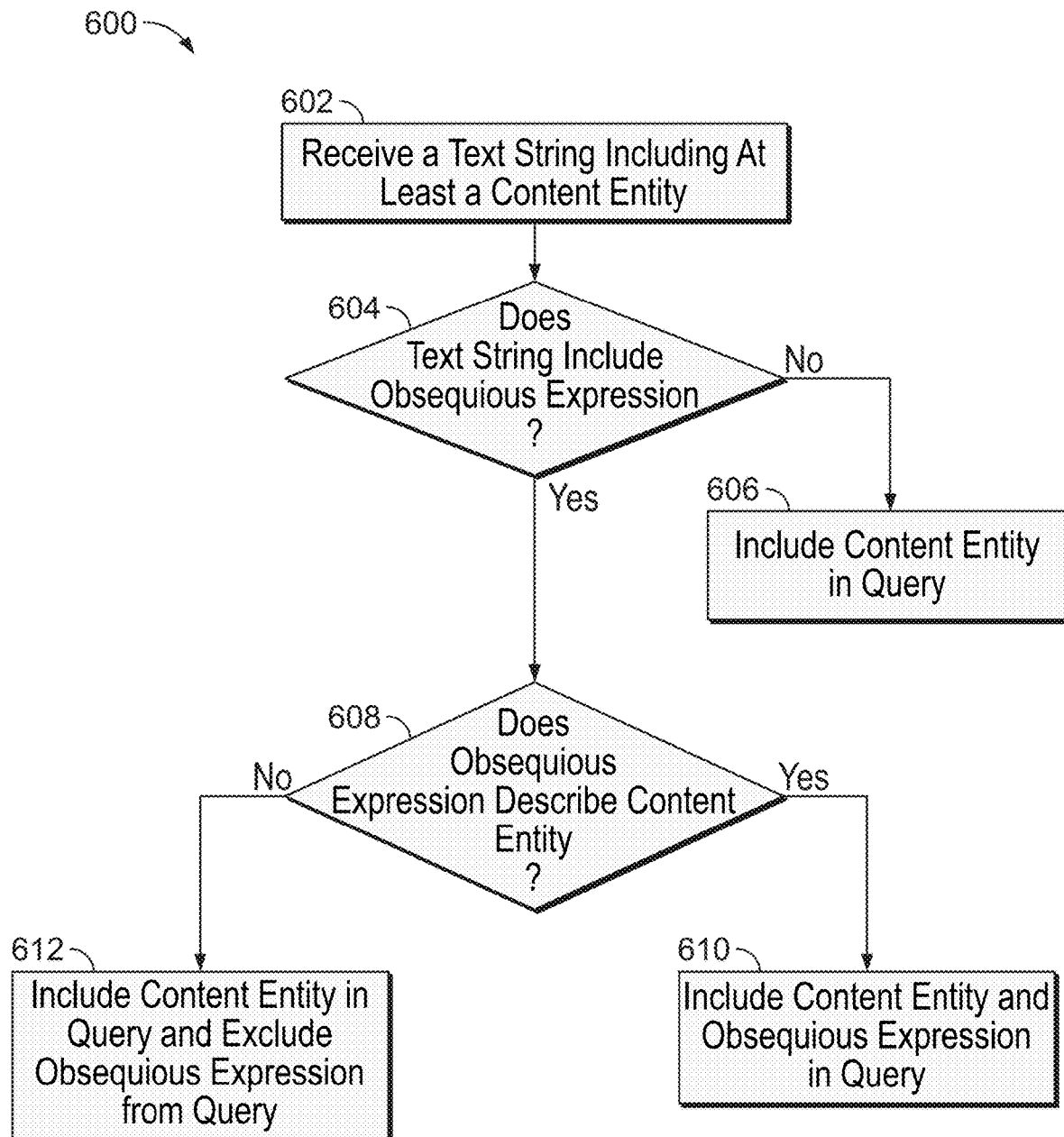

With continued reference to FIG. 1, an example natural language model training and operation is now described relative to a natural language model training process 500 of FIG. 5. FIG. 5 illustrates a flow chart of a natural language model training process, in accordance with some embodiments and methods. In FIG. 5, the natural language model training process 500 is disclosed in accordance with some embodiments and methods. In process 500, at step 502, binary model 104 receives a text string, such as text string 132 or text string 134, from device 102, as previously described. The received text string includes at least one content entity. For example, text string 132 includes content entity "Thank you for smoking" and text string 134 includes content entity "Play Game of Thrones".

Next, at step 504 in FIG. 5, binary model 104 performs a determination of whether the text string of step 502 includes an obsequious expression. For example, binary model 104 may determine that "Thank you for smoking" includes the obsequious expression "thank you" or "Play Game of Thrones, please" includes the obsequious expression "please". In some embodiments, binary model 104 determines the presence or absence of an obsequious expression in a text string based on a comparison test. For example, binary model 104 may determine whether the text string includes an obsequious expression by comparing the obsequious expression to a list of stored obsequious expressions for a match. For example, "thank you" may be compared to a list of stored obsequious expressions that may or may not include "thank you" and "please" may be compared to the same or a different list of stored obsequious expressions that may or may not include "please" and that may or may not include "thank you". The list of stored obsequious expressions may be stored in database 106 or in a different database or a combination of database 106 and one or more other databases. The list of obsequious expressions may be stored in a storage device other than a database, such as large data storage made of nonvolatile or volatile (or a combination) memory. In some embodiments, binary model 104 may implement an obsequious expression identification operation by employing one or more other or additional suitable classification prediction algorithms.

At step 504, in response to binary model 104 determining the text string includes an obsequious expression, process 500 proceeds to step 506, otherwise, in response to binary model 104 determining the text string does not include an obsequious expression, process 500 proceeds to step 512. At step 512, binary model 104 forwards the query with the content entity to content database 106 for storage and maintenance. For example, binary model 104 may forward the query with the content entity to update content entity data structure 130 in database 106. Subsequently, the query may be forwarded to an NLU processor for NLU processing. For example, binary model 104 may forward the query "Thank you for smoking!" to database 130 and update or cause updating of content entity data structure 130 with the content identity of step 502 for NLU processing by an NLU processor 1014, in FIG. 10. At step 512, the query includes the text string of step 502 with no part excluded, whereas, at step 508, the query is stripped of the obsequious expression part of the text string to facilitate legacy system architecture integration, for example to plug into a system with NLU processing devices, such as NLU processor 914, with little to no architectural change.

In some embodiments, content database 106 houses and manages obsequious expressions analogously with content entities. That is, as obsequious expressions are identified by binary model 104, content database 106 may update (or caused to be updated) an obsequious expression data structure with the identified obsequious expressions. Alternatively, or additionally, the obsequious expressions of the obsequious expression data structure may subsequently be part of or make up the entire training set for predicting obsequious expressions to improve obsequious expression distinction prediction, for example, whether an obsequious expression is intended as an obsequious expression, or not. Employing an obsequious expression prediction model may improve the decision-making capability of process 500 (or processes 600-800) by further assisting with overall natural language predictions of the NLU system. In some embodiments, obsequious expression data structures may reside in a content database other than content database 106 or span across multiple content databases.

Next, at step 506 of process 500, binary model 104 determines whether the obsequious expression detected at step 504 describes the content entity. For example, binary model 104 may determine whether the obsequious expression "thank you" of text string 132 or the obsequious expression "please" of text strings 134 describes a corresponding content entity. For text string 132, binary model 104 may determine the obsequious expression "thank you" describes "for smoking" (not intended as an obsequious expression) and for text string 134, binary model 104 may determine the obsequious expression "please" does not describe "play Game of Thrones" (intended as an obsequious expression). In some embodiments, binary model 104 facilitates the foregoing obsequious expression descriptor identification, at step 506, by implementing NLU algorithms, such as, without limitation, as discussed above. In some embodiments, binary model 104 performs the determination step 506 by implementing a suitable natural language understanding algorithm for reliable obsequious expression description detection.

In response to determining the obsequious expression describes the corresponding content entity at step 506, process 500 proceeds to step 510, otherwise, in response to determining the obsequious expression does not describe the corresponding content entity at step 506, process 500 proceeds to step 508.

At step 508, binary model 104 forwards the query with the content entity but without the obsequious expression to content database 106 for subsequent NLU processing as discussed relative to step 512 above. Taking the text string 134, "Play Game of Thrones, Please!", as an example, binary model 104 forwards "play Game of Thrones" but not "please" to content entity data structure 130 of content database 106. Accordingly, no model re-training is necessary.

At step 510, binary model 104 forwards the query with the content entity including the corresponding obsequious expression to content database 106 for subsequent NLU processing as discussed relative to step 512 above. Taking the text string "Thank you for smoking!" example, binary model 104 forwards the entire string "thank you for smoking" to a corresponding content entity data structure in database 106.

Figure 10:
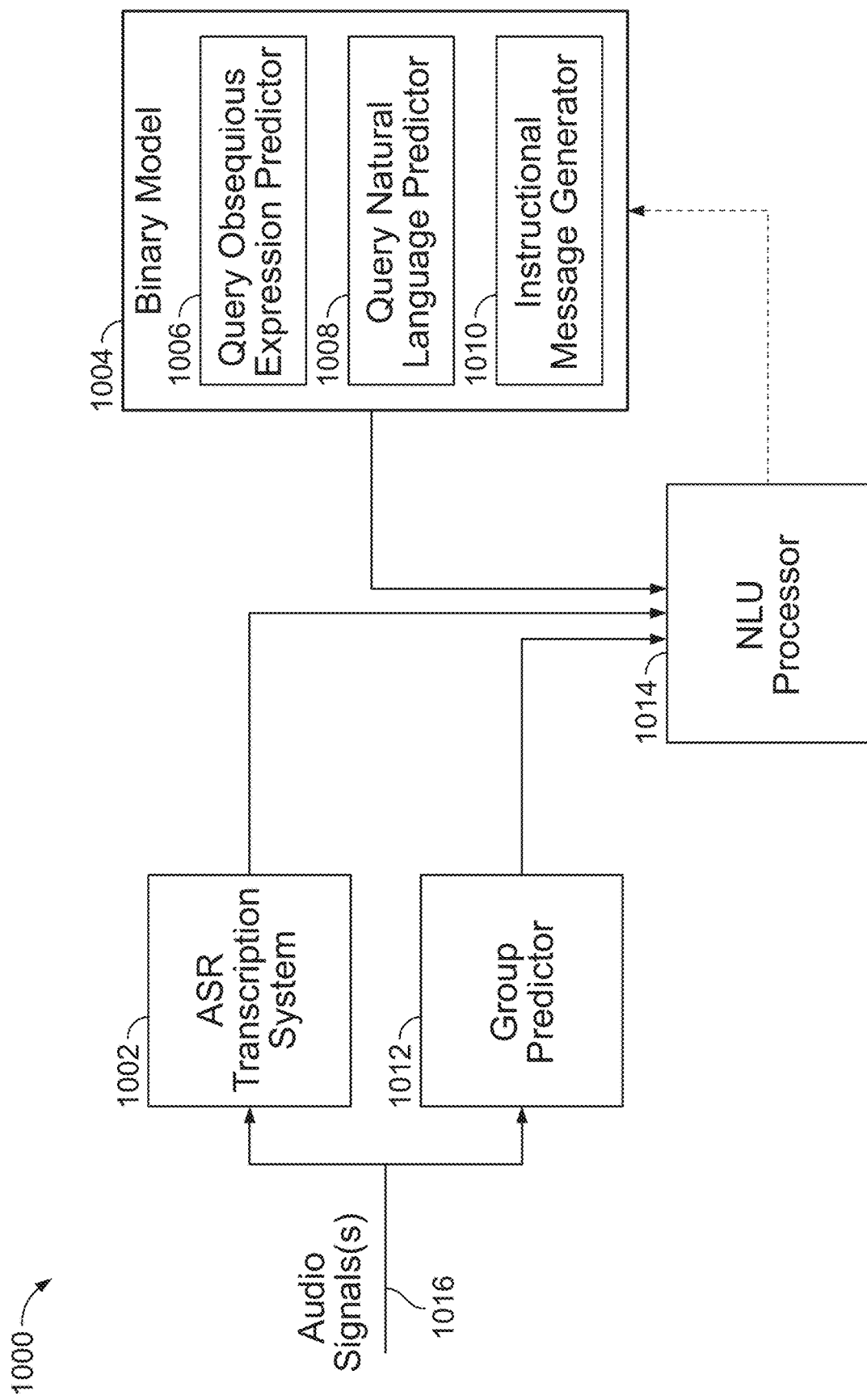
FIG. 10 is an illustrative block diagram showing a natural language recognition system, in accordance with some embodiments of the disclosure.

In example embodiments, queries generated at steps 512, 508, and 510 are employed by an NLU processor, such as NLU processor 1014 of FIG. 10, for further natural language recognition processing.

Figure 8:
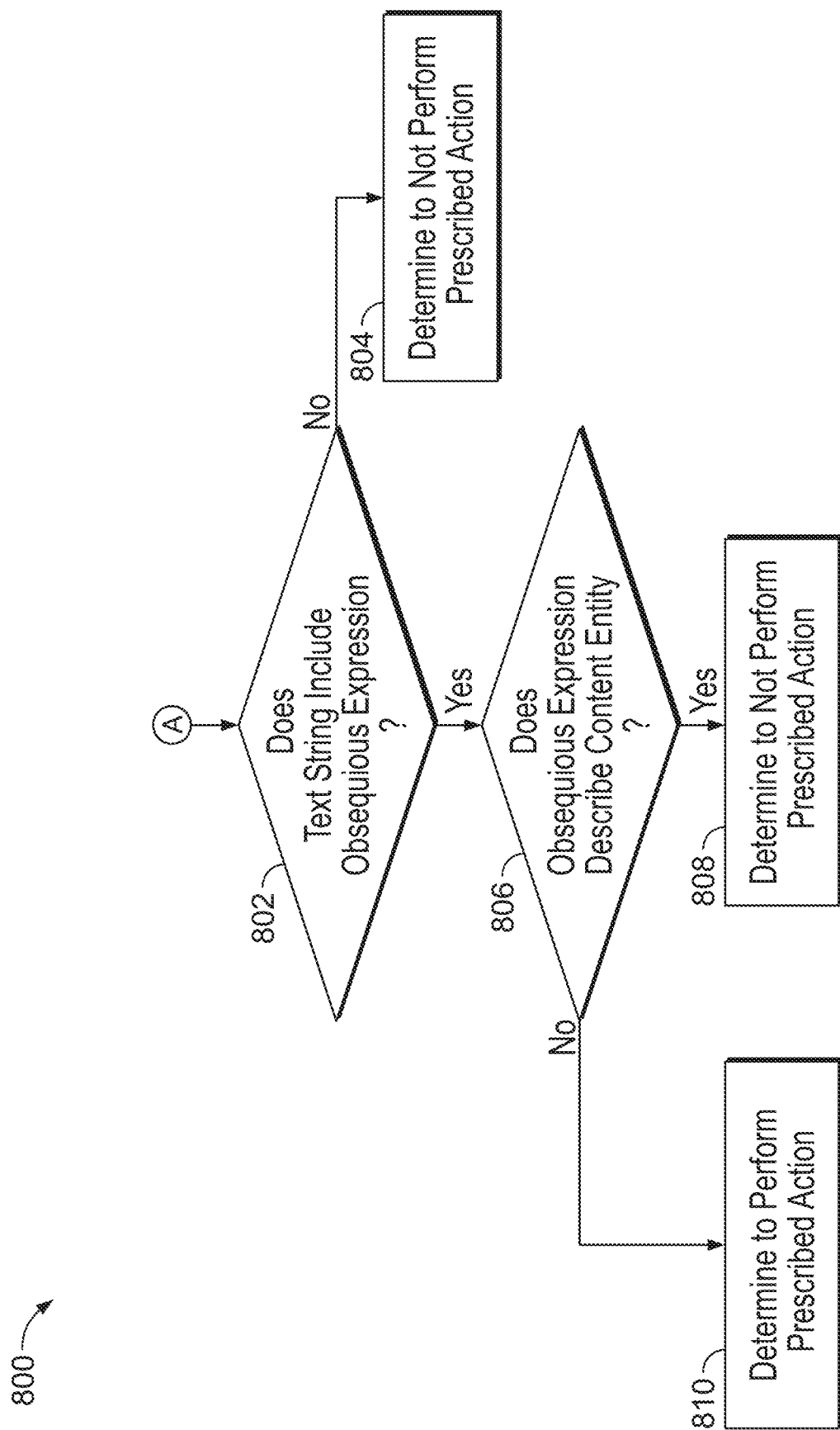
Figure 9:
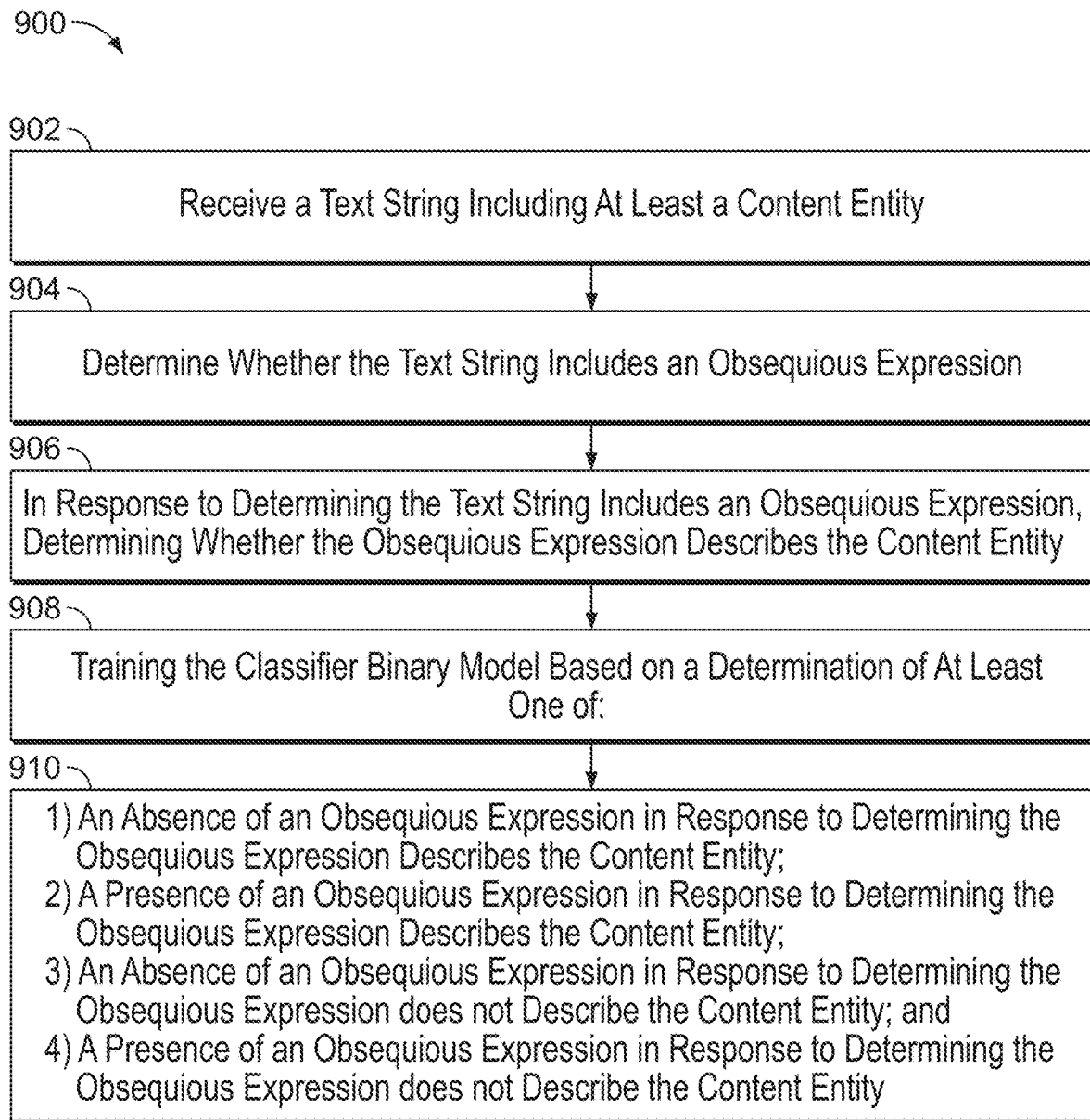

Although a particular order and flow of steps is depicted in each of FIGS. 8-10, it will be understood that in some embodiments one or more of the steps may be modified, moved, removed, or added, and that the flows depicted in FIGS. 8-10 may be suitably modified.

Figure 2:
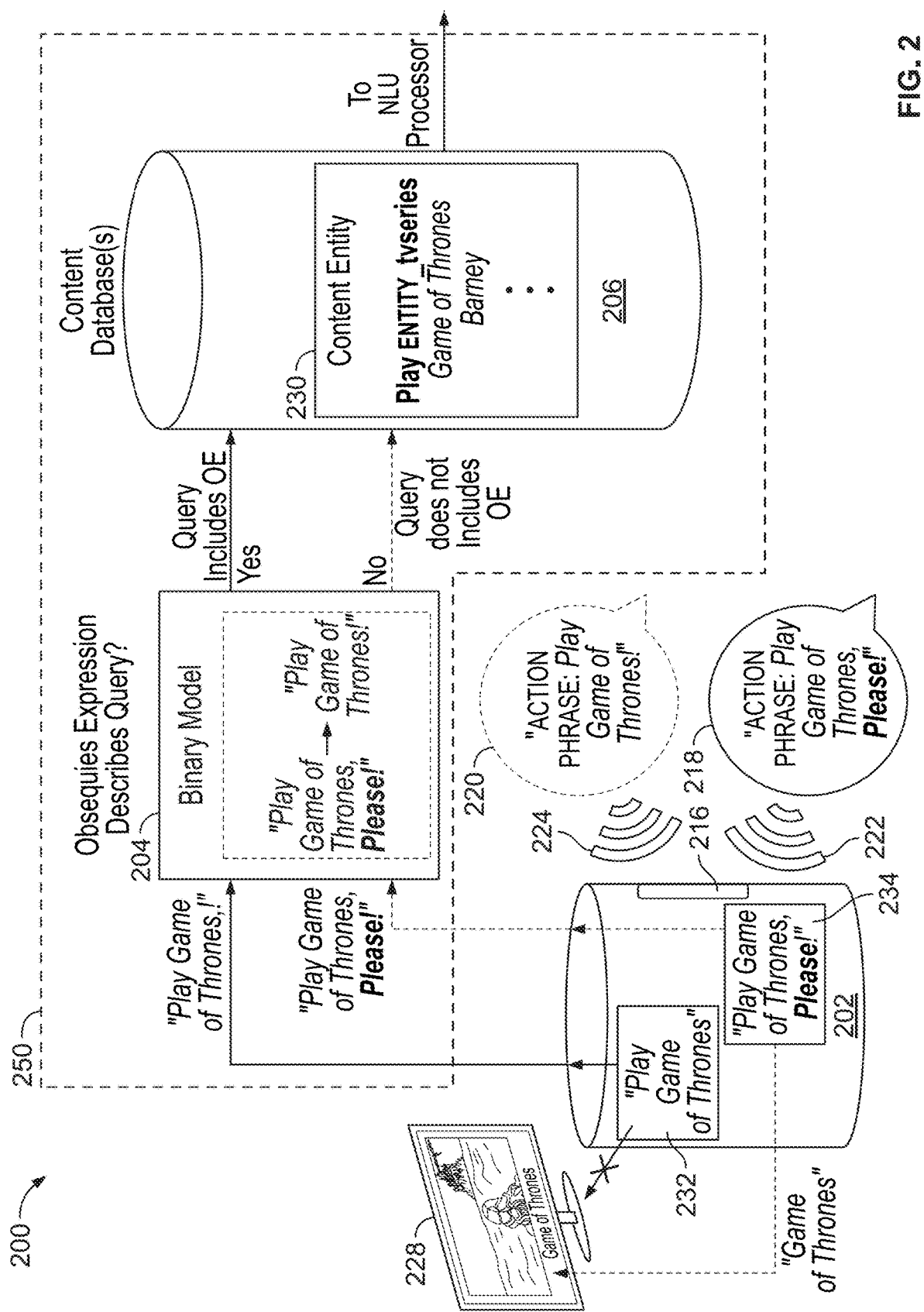

FIG. 2 illustrates a natural language understanding (NLU) system, in accordance with various disclosed embodiments and methods. In FIG. 2, a natural language understanding (NLU) system is configured as a natural language understanding (NLU) system 200, in accordance with various disclosed embodiments and methods. In some embodiments, NLU system 200 is configured analogously to NLU system 100 with exceptions as described and shown relative to FIG. 2. In FIG. 2, NLU system 200 is shown to include a device 202, a classifier binary model 204, and a content database 206, in accordance with disclosed embodiments. Database 206 is analogous to database 106 but functions performed by binary model 204 deviate from those of binary model 104 as described below.

In some embodiments, system 200 implements a query generation method using a trained natural language model in accordance with the steps of process 600. Device 202 receives voice input 218 or 220 by wire or wirelessly, via transmission 222 and 224, respectively, and transcribes or has transcribed voice input 218 or 220 to text string 234 or text string 232, respectively. At step 602, device 202 may receive input 218 or 220 at receiver 216. In some embodiments, receiver 216 may be implemented as a microphone communicatively coupled to device 202 through wire or wirelessly, as discussed relative to the receiver 116 of FIG. 1.

Next, at step 604, binary model 204 performs a determination as to whether the text string of step 602 includes an obsequious expression. As discussed, relative to step 504 of FIG. 5, in some embodiments, binary model 204 may make an obsequious expression identification determination at step 604 in various manners. For example, binary model 204 may determine the presence or absence of an obsequious expression based on a comparison test, as earlier described, or in accordance with other suitable techniques.

In response to determining the text string includes an obsequious expression at step 604, process 600 proceeds to step 608, otherwise, if at step 604, binary model 204 determines the text string of step 602 does not include an obsequious expression, process 600 proceeds to step 606. With continued reference to the example embodiment of FIG. 2, in response to binary model 204 determining text string 232 or text string 234 of voice input 220 or voice input 218, respectively, includes an obsequious expression, binary model 204 implements step 608 of process 600 and in response to binary model 204 determining text string 232 or text string 234 does not include an obsequious expression, binary model 204 implements step 606 of process 600.

At step 606, a query is generated for natural language voice-recognition processing (or NLU processor 914) that includes the entirety of the text string of step 602. In an example application with reference to FIG. 2, assuming device 202 receives voice input 220 through transmission 224, device 202 forwards the text string "play Game of Thrones" 232, fully intact, to binary model 204 and binary model 204 performs an obsequious expression determination (at step 604 in FIG. 6) that yields no obsequious expression is found in the text string "Play Game of Thrones". Accordingly, binary model 204 includes the entirety of the text string in the query and database 206 is updated similarly to the database 106 updating explained above. That is, a content entity data structure 230 of database 206 is updated in accordance with the manner described above relative to content entity data structure 130.

But in response to binary model 204 determining the text string of step 602 includes an obsequious expression, binary model 204 tests the obsequious expression at step 608, as discussed with reference to step 506 of FIG. 5. Binary model 204 may determine the obsequious expression to describe the content entity, therefore, the obsequious expression is an unintended polite expression. In some embodiments, binary model 204 may perform step 608 by implementing a natural language recognition algorithm, such as the list presented with reference to step 506 of FIG. 5. In response to determining the obsequious expression describes the content entity at step 608, process 600 proceeds to step 608 and in response to determining the obsequious expression does not describe the content entity at step 608, process 600 proceeds to step 612. At step 610, the query is generated with the content entity and the obsequious expression and at step 612, the query is generated with the content entity but without the obsequious expression.

In response to generating the query at steps 606, 610 and 612, binary model 204 updates the content entity data structure 230 of database 206 and transmits the generated query to the natural language model to train the natural language model with the query. For example, the query may be transmitted to NLU processor 1014 of FIG. 10.

In some embodiments, device 202 may control operational features of a media device, such as a media device 228. For example, device 202 may control power-on, power-off and play mode operations of media device 228. In these embodiments, device 202 may control the operation of media device 228 in accordance with binary model 204 prediction outcomes. For example, at step 608 in process 600, in response to the binary model 204 prediction being that the obsequious expression does not describe the corresponding content entity, device 204 may respond positively to a command query. In a practical operation, taking text string 234 as an example, if binary model 204 decides that the obsequious expression "please" does not describe "play Game of Thrones", device 204 may communicatively cause media device 228 to play Game of Thrones because at the earlier 604 step, binary model 204 determined that an obsequious expression is present in text string 234. In an additional practical example, assuming process 600 makes it to step 606, where binary model 204 decides that the obsequious expression "thank you" in absent in text string 230 ("Play Game of Thrones!"), device 204 may not consummate a play operation on media device 228 consistent with the command query in the text string 230 to play Game of Thrones.

In some embodiments, media device 228 may be a device capable of playing media content as directed by device 204. For example, media device 228 may be a smart television, a smartphone, a laptop or other suitable smart media content devices.

Figure 3:
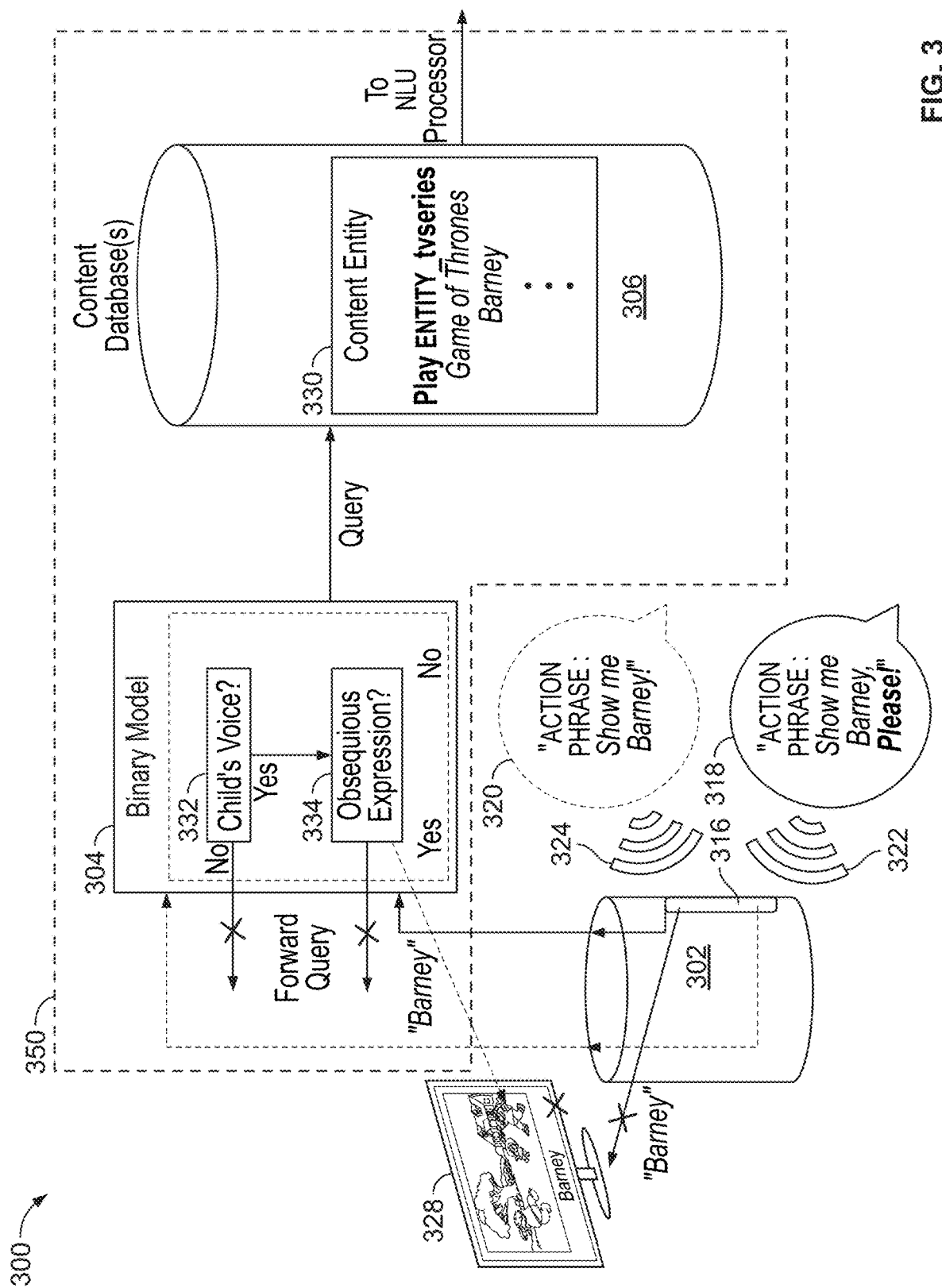

FIG. 3 illustrates a natural language understanding (NLU) system, in accordance with various disclosed embodiments and methods. In FIG. 3, a natural language understanding (NLU) system is configured as a natural language understanding (NLU) system 300, in accordance with various disclosed embodiments and methods. In some embodiments, NLU system 300 is configured analogously to NLU systems 100 and 200 with exceptions as described and shown relative to FIG. 3. In FIG. 3, NLU system 300 is shown to include a device 302, a classifier binary model 304, and a content database 306, in accordance with disclosed embodiments. Database 306 is analogous to databases 106 and 206 but functions performed by binary model 304 deviate from those of binary models 104 and 204 as described below.

In some embodiments, system 300 implements an action of a query using a trained natural language model of an NLU system in accordance with some of the steps of process 700 (FIG. 7) and process 800 (FIG. 8). Device 302 receives voice input 318 or 320 by wire or wirelessly, via transmission 322 and 324, respectively. A natural language model training pre-processing unit 350 may include device 302, binary model 204 and content database 306 or a combination thereof, as described relative to pre-processing unit 150 of FIG. 1. In accordance with an example operation, pre-processing unit 350 performs an action of a query based on a text string of the query corresponding to a prescribed action. The query includes at least a content entity with the text string. For example, device 302 may receive voice input 318 or 320 and in response, device 302 may transcribe or have transcribed the received voice input to a text string in manners described above, for example.

Pre-processing unit 350 may determine whether the text string corresponds to an audio input of a classified group (a user type). In some embodiments, group classification may be based on various characteristics or attributes such as, without limitation, age (adults versus children), gender, demographics, as previously discussed. For example, a group may be classified based on one or more acoustic characteristics of audio signals corresponding to the voice (or audio) input 320 and 318 (FIG. 3). In some embodiments, the acoustic characteristics of a voice input may determine the classified group. For example, certain spectral characteristics of voice input 318 or 320 may determine a group at 332 (FIG. 3) or at step 704 (FIG. 7) based on a group classification. In some embodiments, a group is determined based on acoustic characteristics or other suitable voice processing techniques, such as those disclosed in Patent Cooperation Treaty (PCT) Application No. PCT/US20/20206, filed on Feb. 27, 2020, entitled "System and Methods for Leveraging Acoustic Information of Voice Queries", by Bonfield et al., incorporated herein by reference as though set forth in full and Patent Cooperation Treaty (PCT) Application No. PCT/US20/20219, filed on Feb. 27, 2020, entitled "System and Methods for Leveraging Acoustic Information of Voice Queries", by Bonfield et al., incorporated herein by reference as though set forth in full. In some embodiments, the audio input user type at 322 and/or step 702 may be implemented using other suitable spectral analysis techniques.

With continued reference to FIG. 3, in response to determining the text string corresponds to an audio input from a child, pre-processing unit 350 may determine whether the text string includes an obsequious expression. Based on the outcome of the determination, pre-processing unit 350 determines whether the text string includes an obsequious expression, or not, and decides to perform the prescribed action, or not. For example, in response to determining the text string includes an obsequious expression, pre-processing unit 350 may determine to perform the prescribed action and in response to determining the text string does not include the obsequious expression, pre-processing unit 350 may determine to not perform the prescribed action.

As with the embodiments of FIGS. 1 and 2, the functions of device 302, binary model 304 or a combination thereof may be performed partly or entirely in a communication network by a communication network element.

Device 302 may receive voice input 318 or voice input 320 at receiver 316. In some embodiments, receiver 316 may be implemented as a microphone communicatively coupled to device 302 through wire or wirelessly, as discussed relative to the receiver 116 of FIG. 1.

Figure 4:
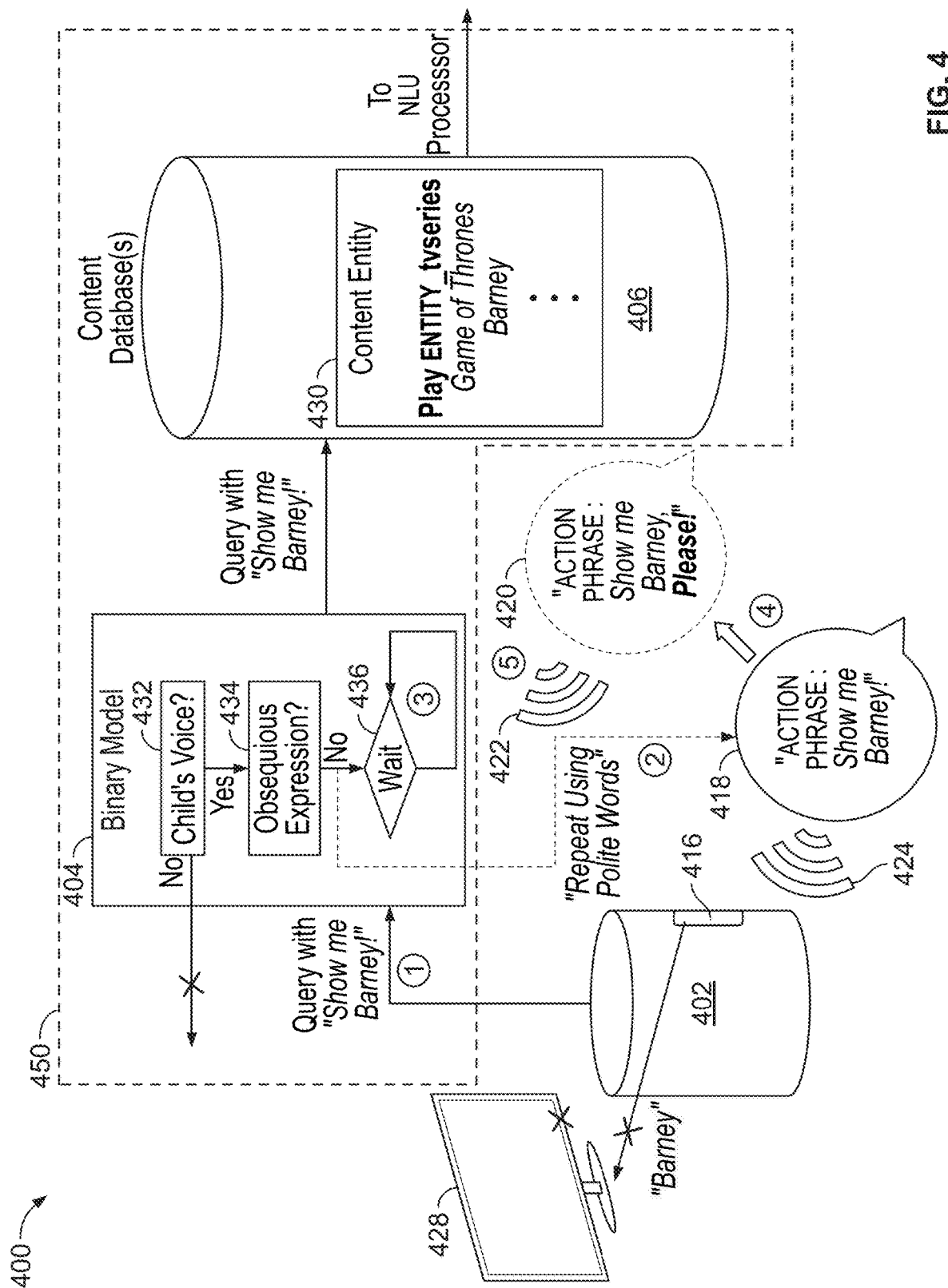

In some embodiments, device 302 receives voice input 318 or voice input 320 and transcribes or has transcribed the received voice input to a text string. For example, device 302 may transcribe voice input 318 to text string "show me Barney, please" or voice input 320 to text string "show me Barney". Device 302 transmits a query with the transcribed text string to binary model 304. The query includes a content entity with the text string. Stated differently, the text string, or parts thereof, is a categorized entity of the content entities of content database 306. In the example of FIG. 3, the text string corresponding to voice input 318 or voice input 320 corresponds to a prescribed action, e.g., to play (or show) a show on a media device. Device 302 may direct a media device, such as media device 328, to perform the prescribed action. For example, device 302 may direct media device 328 to power-on or power-off. In response to a text string corresponding to voice input 318 or voice input 320, device 302 may solicit a play action from media device 328 causing media device 328 to play the show Barney, for example. But performing the prescribed action is qualified in some embodiments. In the embodiment of FIGS. 3 and 4, performing the prescribed action hinges on detecting a child's voice, at 332 in FIG. 3, whether the text string includes an obsequious expression, at 334, and whether the obsequious expression is intended as an obsequious expression or rather describes or corresponds to a remaining portion of the text string, i.e., the non-obsequious expression portion of the text string. In some embodiments, if binary model 304 does not detect a child's voice, the prescribed action is not performed by device 302 and if binary model 304 detects a child's voice, binary model 302 tests the text string of the received query for the presence or absence of an obsequious expression, at 334. In response to detecting an obsequious expression at 334, binary model 304 causes device 302 to play Barney. For example, assuming device 302 receives voice input 318 from a child at receiver 316, device 302 transmits a query with text string "show me Barney, please" to binary model 304. Binary model 304 determines the text string to originate from a child at 332 and tests the text string for including a polite expression at 334. In this example, because the text string includes the term "please", binary model 304 determines the prescribed action of playing Barney should be performed and directs device 302 to cause media device 328 to play Barney. On the other hand, in response to voice input 320, binary model 304 while determining the voice input 320 originates from a child at 332, at 334, device model 304 detects the absence of a polite expression and does not enable device 302 to cause media device 328 to play Barney. The prescribed action need not be a play action, it can be a power-on or other types of actions controllable by a device determinative of a child's voice and obsequious expressions. In some embodiments, binary model 304 or other suitable devices may cause media device 328 to perform the action. In some embodiments, the action is not performed until the detected obsequious expression of the text string is tested for describing the text string as described relative to steps 506 and 608 of FIGS. 5 and 6, respectively.

Figure 7:
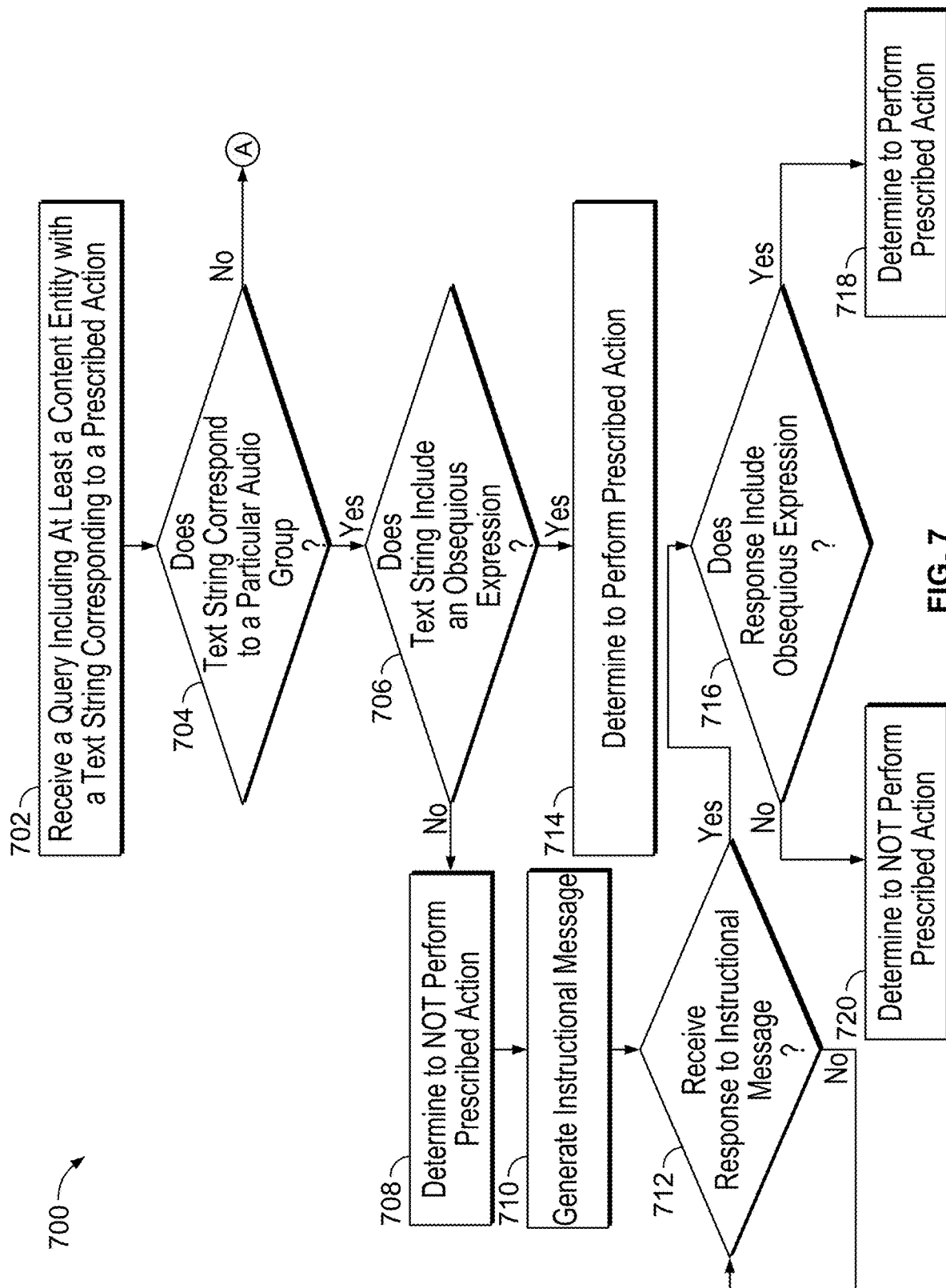

Referring now to FIGS. 3 and 7, at step 702 of process 700, binary model 304 receives a query from device 302 that includes at least a content entity with a text string corresponding to a prescribed action. The prescribed action is based on a corresponding voice input, as described above. For example, the prescribed action of both voice input 318 and 320 is "show me Barney". Device 302 transmits the text string corresponding to voice input 318 or 320 to binary model 304 for classification. Binary model 304 performs steps 704, 706, 708, and the steps of process 800 (FIG. 8) to determine whether to perform the action prescribed by the query that is forwarded by device 302.

More specifically, at step 704, binary model 304 performs a determination of whether the text string of step 702 corresponds to an audio input from a child. In some embodiments, binary model 304 makes the determination based on spectral analysis. Nonlimiting example spectral analysis techniques or other suitable voice recognition techniques are disclosed in Patent Cooperation Treaty (PCT) Application No. PCT/US20/20206, filed on Feb. 27, 2020, entitled "System and Methods for Leveraging Acoustic Information of Voice Queries", by Bonfield et al. and Patent Cooperation Treaty (PCT) Application No. PCT/US20/20219, filed on Feb. 27, 2020, entitled "System and Methods for Leveraging Acoustic Information of Voice Queries", by Bonfield et al. In some embodiments, binary model 304 tests for a child's voice by implementing other suitable child voice detection techniques. In response to binary model 304 detecting a child's voice at step 704, process 700 proceeds to step 706, otherwise, in response to binary model 304 detecting the absence of a child's voice at step 704, process 700 proceeds to step 802 of process 800 (FIG. 8).

At step 706, binary model 304 determines whether the text string corresponding to voice input 318 or 320 includes an obsequious expression. As earlier noted, relative to steps 504 and 604 of FIGS. 5 and 6, respectively, in some embodiments, binary model 304 detects the presence or absence of an obsequious expression by implementing a comparison test but binary model 304 may employ other suitable algorithms for the determination of step 706. If at step 706, binary model 304 detects an obsequious expression, process 700 proceeds to step 714, otherwise, if at step 706, binary model 304 detects the absence of an obsequious expression, process 700 proceeds to step 708.

At step 714, binary model 304 determines to perform the prescribed action in the query forwarded by device 302. For example, assuming voice input 318 from a child is received by device 302, binary model 304 detects the child's voice, determines "please" is in the text string that corresponds to the received voice input and it is an intended obsequious expression. Accordingly, binary model 304 may direct device 302 to cause media device 328 to play Barney. On the other hand, at step 708, given the same example scenario, an opposite determination is reached and binary model 304 does not direct device 302 to enable media device 328 to play Barney.

At step 802 of process 800 (FIG. 8), binary model 304 determines whether the text string corresponding to voice input 318 or voice input 320 includes an obsequious expression. In response to determining the text string includes an obsequious expression at step 802, binary model 304 performs step 806, otherwise, in response to determining the text string does not include an obsequious expression, binary model 304 performs step 804. At step 804, the prescribed action of the forwarded query is determined not to be performed whereas at step 806, a further determination is performed as to whether the detected obsequious expression of step 802 is an intended polite term or whether it describes, relates to corresponds to a non-obsequious expression. For example, a child voice input "thank you for playing Barney" would not cause the prescribed action to be performed by "thank you" while detected as an obsequious expression at step 802, would be determined to be an unintended polite term. Accordingly, in response to a determination at step 806 that the detected obsequious expression is an unintended polite term, binary model 304 performs step 808 whereas in response to a determination at step 806 that the detected obsequious expression is an intended polite term, binary model 304 performs step 810 and determines that the prescribed action is to be performed.

At step 708 of process 700, binary model 304 determines not to perform the prescribed action because, assuming voice input 320 from a child is received by device 302, the corresponding text string does not contain a polite term. Accordingly, media play 328 does not play Barney. In some embodiments, the binary model may take further action, as discussed relative to the embodiment of FIG. 4.

FIG. 4 illustrates a natural language understanding (NLU) system, in accordance with various disclosed embodiments and methods. In FIG. 4, a natural language understanding (NLU) system is configured as a natural language understanding (NLU) system 400, in accordance with various disclosed embodiments and methods. In some embodiments, NLU system 400 is configured analogously to NLU systems 100-300 with exceptions as described and shown relative to FIG. 4. In FIG. 4, NLU system 400 is shown to include a device 402, a classifier binary model 404, and a content database 406, in accordance with disclosed embodiments. Database 406 is analogous to databases 106, 206, and 306 but functions performed by binary model 404 deviate from those of binary models 104-304 as described below.

In some embodiments and as earlier noted, binary model 404 of system 400 implements further actions in response to a determination that an obsequious expression is absent in a text string corresponding to voice input (or audio input) from a particular user type (or user type of interest). For example, as discussed relative to FIGS. 3 and 7, an audio input user type may be a child. That is, voice input 318, in FIG. 3, and/or voice input 418 in FIG. 4 may correspond to a child's voice. Assuming the originator of voice input 418 is a child, binary model 404, in FIG. 4, detects a child's voice at 432, or not, and in response to detecting a child's voice looks for an obsequious expression at 434, similar to that which is done at steps 334 and 334 of FIG. 3, respectively.

In response to detecting the absence of a child's voice at 432, binary model 404 determines the prescribed action should not be performed and in response to detecting a child's voice and further detecting an obsequious expression, binary model determines that the prescribed action should not be performed. But in the latter case, binary model 404 gives a chance to the child (or originator of the voice input such as voice input 418) to repeat the voice input, this time with a polite expression. In some embodiments, binary model 404 may send an instructional message to the child asking to repeat the voice input with a polite term. Next, binary model 404 may wait for a time period, at 436, for a detected response, for example, voice input 420. In response to device 402 receiving voice input 420 at receiver 416, binary model 404 may determine to perform the prescribed action, for example, cause media device 428 to play Barney. If binary model 404 waits the time period at 436 and no received voice input including an obsequious expression, binary model 404 determines the action should not be performed. Expiration of the time period with no voice input 420 received, therefore, causes no action to be taken by media device 428.

In some embodiments, binary device 404 may implement a responsive instructional message to the child through device 402 or other suitable devices communicatively compatible with binary model 404. In embodiments where binary model 404 sends an instruction message through device 402, device 402 requires voice generation features, such as speakers. Binary model 404 may directly communicate with the child using voice generation features. In the embodiment of FIG. 4, binary model 404 implements the steps discussed relative to FIG. 3 and additionally implements steps 710 through 718.

In some embodiments, binary model 404 generates an instructional message at step 710, as discussed relative to binary model 404 actions in FIG. 4. Next, at step 712, binary model 404 performs a determination of whether the instructional message transmitted during a time period, as discussed relative to FIG. 4 above, is received. In some embodiments, binary model 404 makes this determination by waiting for receipt of a voice input, such as voice input 420, within a time period, as discussed relative to the binary model 404 actions of FIG. 4. If no voice input is detected during the time period, binary model 404 determines the instructional message was not received and proceeds to step 716 of FIG. 7. The time period for waiting for receipt of a responsive voice input from a child is a design choice and may be predetermined time period or may be implemented by polling or other suitable techniques.

When or if binary model 404 reaches step 716, a voice input, such as voice input 420, is detected and at step 716, binary model 404 determines whether the received voice input includes an obsequious expression. If binary model 404 determines the voice input includes an obsequious expression, binary model 404 performs step 720, otherwise, if binary model 404 determines the voice input does not include an obsequious expression, binary model 404 performs step 718. At step 720, the prescribed action of the query transmitted by device 402 is not performed and at step 718, the prescribed action is performed, as earlier discussed.

In some embodiments, a process for training a classifier binary model with obsequious expressions in accordance with methods of the disclosure may be implemented. FIG. 9 depicts an illustrative process flow for training a classifier binary model with obsequious expressions in a NLU system, in accordance with some embodiments of the disclosure. In FIG. 9, a process 900 depicts an illustrative process for training a classifier binary model with the presence and absence of obsequious expressions, in accordance with some embodiments of the disclosure.

In some embodiments, a method of training a classifier binary model is generally performed by receiving a text string including at least a content entity, determining whether the text string includes an obsequious expression. In response to determining the text string includes an obsequious expression, determining whether the obsequious expression describes the content entity and training the classifier binary model based on a determination of at least one of: an absence of an obsequious expression in response to determining the obsequious expression describes the content entity; a presence of an obsequious expression in response to determining the obsequious expression describes the content entity; an absence of an obsequious expression in response to determining the obsequious expression does not describe the content entity; and a presence of an obsequious expression in response to determining the obsequious expression does not describe the content entity. These steps are described in further detail below relative to FIG. 9.

In nonlimiting examples, a classifier binary model of an NLU system may be trained by each of the systems 100-400 in accordance with process 900 of FIG. 9. In some embodiments, any suitable NLU system may implement the process 900 of FIG. 9. For the purpose of simplicity, system 100 is discussed below in conjunction with the steps of process 900.

At step 902, device 102 of system 100 receives a text string including at least a content entity. For example, device 102 may receive text string 118 or text string 120. As earlier discussed with reference to FIG. 1, device 102 may transmit text string 134 to classifier binary model 104 and classifier binary model 104 may implement steps 904-914. In some embodiments, device 102 or other suitable devices communicatively coupled to or incorporated in device 102 or pre-processing unit 150 may implement process 900.

Assuming binary model 104 is performing the steps of FIG. 9, after step 902, at step 904, binary model 104 determines whether text string 118 (or text string 120, as the case may be) includes an obsequious expression. In response to determining an obsequious expression is found in the text string of step 902, binary model 104 makes another determination at step 906. In some embodiments, if no obsequious expression is found at step 904, process 900 stops. In some embodiments, if no obsequious expression is found at step 904, further step(s) may be implemented as a part of process 900 to train binary model 104 with the absence of an obsequious expression from the text string of step 902. In some embodiments, the determination part of step 906 to find an obsequious expression in the text string is made in a manner similar to step 504 of FIG. 5, as described earlier.

At step 906, binary model 104 determines whether the obsequious expression (found at step 904) describes the content entity of step 902. In some embodiments, the determination part of step 906 to find whether the obsequious expression describes a content entity, or not, is performed in a manner similar to step 506 of FIG. 5, as discussed earlier. At step 908, binary model 104 is trained based on the determination at step 906. That is, at step 910, in response to determining whether the obsequious expression describes the content entity of step 906, in accordance with process 900, binary model 104 is trained with at least one of the following: 1) the absence of an obsequious expression in response to determining the obsequious expression describes the content entity; 2) the presence of an obsequious expression in response to determining the obsequious expression describes the content entity; 3) the absence of an obsequious expression in response to determining the obsequious expression does not describe the content entity; and 4) the presence of an obsequious expression in response to determining the obsequious expression does not describe the content entity.

In the example of FIG. 9, assuming text string 132, "thank you for smoking", is received at step 902, binary model 104 is trained at step 908 with 2) at step 910—the presence of an obsequious expression in response to the obsequious expression describing the content entity of the text string. Now suppose, text string 134, "play Game of Thrones, please", is received at step 902, binary model 104 is trained at step 908 with 4) at step 910—the presence of an obsequious expression in response to the obsequious expression not describing the content entity.

In some embodiments, binary model 104 updates content database 106 based on the training and prediction determinations of steps 904 through 910. For example, binary model 104 may update content database 106 with "please" as an obsequious expression feature that does not describe a content entity.

In some embodiments, obsequious expressions predictions are maintained by one or more databases or storage devices, other than content database 106. In embodiments employing database 106 or other storage or database devices, database 106 or other storage and/or databases may maintain and update an obsequious expression content entity as discussed herein.

In some embodiments, parts of systems 100, 200, 300, and 400 may be incorporated in a natural language recognition system. FIG. 10 is an illustrative block diagram showing a natural language recognition system, in accordance with some embodiment of the disclosure. In FIG. 10, a natural language recognition system is configured as a natural language recognition system 1000. Natural language recognition system 1000 includes an automatic speech recognition (ASR) transcription system 1002, group predictor 1012 (or group classifier), natural language understanding (NLU) processor 1014, and binary model 1004, in accordance with some embodiments of the disclosure. In some embodiments, group predictor 1012 predicts group classification based on acoustic features and characteristics. For example, predictor 1012 can classify voice input, such as those described and shown herein, based on a group feature, such as a child voice versus an adult voice or a male voice versus a female voice. Other acoustic-based classifications are anticipated. In some embodiments, predictor 1012 employs spectral analysis techniques or other suitable voice recognition techniques to predict group classification as disclosed in Patent Cooperation Treaty (PCT) Application No. PCT/US20/20206, filed on Feb. 27, 2020, entitled "System and Methods for Leveraging Acoustic Information of Voice Queries", by Bonfield et al. and Patent Cooperation Treaty (PCT) Application No. PCT/US20/20219, filed on Feb. 27, 2020, entitled "System and Methods for Leveraging Acoustic Information of Voice Queries", by Bonfield et al.

Classifier binary model 1004 may be configured as binary model 104, 204, 304 or 404 in some embodiments. Binary model 1004 may include a query obsequious expression predictor 106, a query natural language predictor 1008 and an instructional message generator 1010. In some embodiments, one of more of the components shown in system 1000 may be implemented in hardware or software. For example, functions of one or more components may be performed by a processor executing program code to carry out the processes disclosed herein. In some embodiments, process circuitry 1140 or process circuitry 1126 may carry out the processes by executing program code stored in storage 1138 or storage 1124 of FIG. 11, respectively.

In some embodiments, query obsequious expression predictor 1006 may perform determinations at steps 504, 604, 706, 716, and 802; natural language predictor 1008 may perform steps 506, 608, 806; and instructional message generator 1010 may implement transmitting an instruction message, as discussed relative to FIG. 4, in response to a determination of the absence of an obsequious expression assuming the corresponding text string is from a child.

With continued reference to FIG. 10, during operation, an audio signal 1016 is received by system 1002 and predictor 1012. Audio signal 1016 may comprise more than one audio signal and in some embodiments audio signal 1016 represents a user utterance, such as a voice input, examples of which are voice inputs of FIGS. 1-4. System 1002 may implement speech-to-text transcription services. In some embodiments, system 1002 transcribes audio signal 1016. In some embodiments, system 1002 performs transcription services as those described performed by devices of FIGS. 1-4.

Predictor 1012 implements child voice prediction detection, such as described relative to steps 506, 608, 706, and 806. In some embodiments, predictor 1012 implements child speech detection prediction as described in relation to natural language processing (NLP) by implementing voice processing techniques such as those disclosed in Patent Cooperation Treaty (PCT) Application No. PCT/US20/20206, filed on Feb. 27, 2020, entitled "System and Methods for Leveraging Acoustic Information of Voice Queries", by Bonfield et al. and Patent Cooperation Treaty (PCT) Application No. PCT/US20/20219, filed on Feb. 27, 2020, entitled "System and Methods for Leveraging Acoustic Information of Voice Queries", by Bonfield et al.

NLU processor 1014 interacts with binary model 1004 to receive generated queries as described relative to preceding figures, receive determinative outcomes, such as to perform a prescribed action, other suitable functions, or a combination. In some embodiments, NLU processor 1014 may perform natural language recognition functions such as sentence analysis, interpretation determination, template matching, or a combination.

Figure 11:
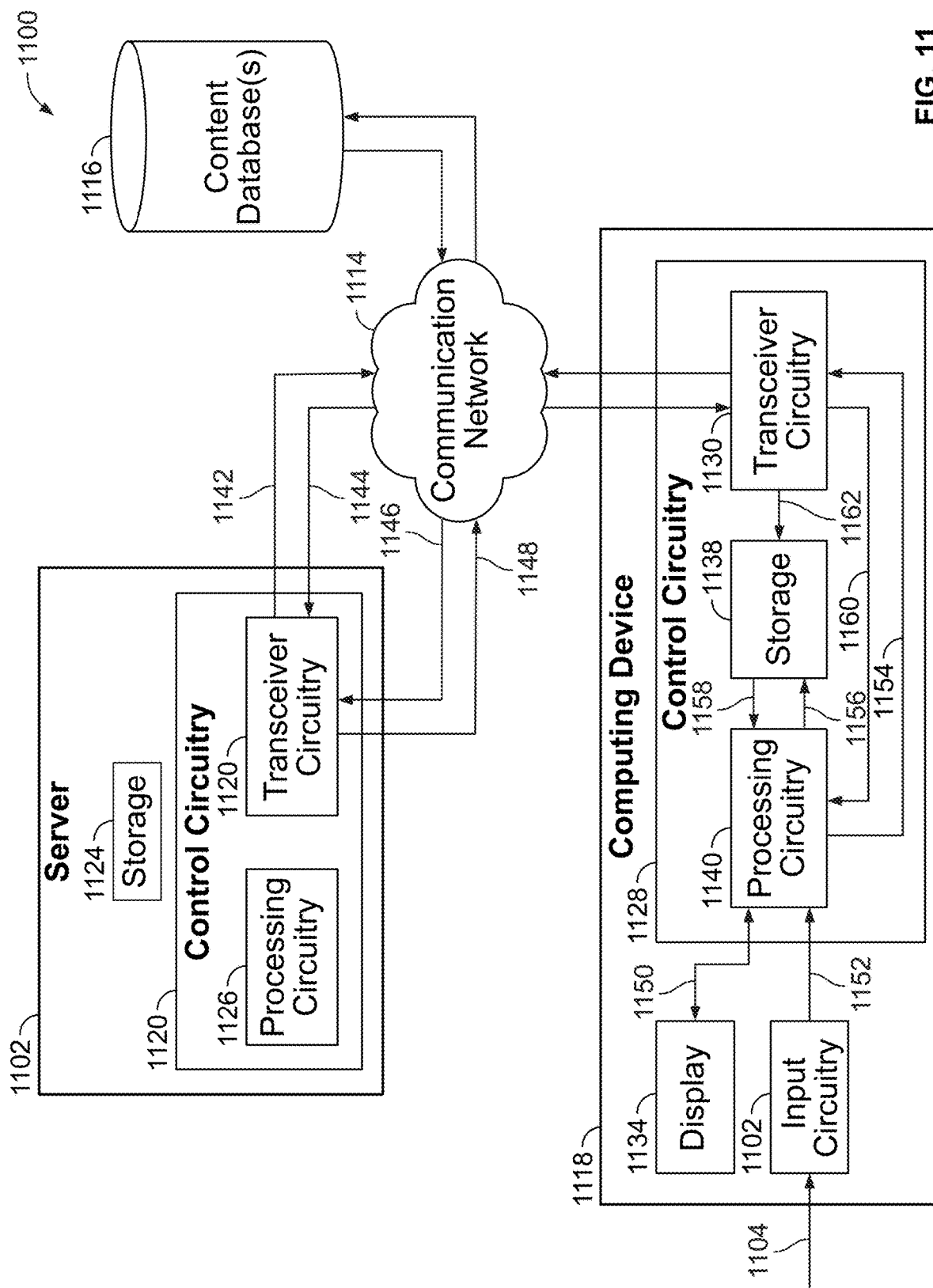
FIG. 11 is an illustrative block diagram showing an NLU system incorporating query generation and model training features, in accordance with some embodiments of the disclosure.

FIG. 11 is an illustrative block diagram showing an NLU system incorporating query generation and model training features, in accordance with some embodiments of the disclosure. In FIG. 11, an NLU system is configured as an NLU system 1100 in accordance with some embodiments of the disclosure. In an embodiment, one or more parts of or the entirety of system 1100 may be configured as a system implementing various features, processes, and displays of FIGS. 1-10. Although FIG. 11 shows a certain number of components, in various examples, system 1100 may include fewer than the illustrated number of components and/or multiples of one or more of the illustrated number of components.

System 1100 is shown to include a computing device 1118, a server 1102 and a communication network 1114. It is understood that while a single instance of a component may be shown and described relative to FIG. 11, additional instances of the component may be employed. For example, server 1102 may include, or may be incorporated in, more than one server. Similarly, communication network 1114 may include, or may be incorporated in, more than one communication network. Server 1102 is shown communicatively coupled to computing device 1118 through communication network 1114. While not shown in FIG. 11, server 1102 may be directly communicatively coupled to computing device 1118, for example, in a system absent or bypassing communication network 1114.

Communication network 1114 may comprise one or more network systems, such as, without limitation, an Internet, LAN, WIFI or other network systems suitable for audio processing applications. In some embodiments, system 1100 excludes server 1102 and functionality that would otherwise be implemented by server 1102 is instead implemented by other components of system 1100, such as one or more components of communication network 1114. In still other embodiments, server 1102 works in conjunction with one or more components of communication network 1114 to implement certain functionality described herein in a distributed or cooperative manner. Similarly, in some embodiments, system 1100 excludes computing device 1118 and functionality that would otherwise be implemented by computing device 1118 is instead implemented by other components of system 1100, such as one or more components of communication network 1114 or server 1102 or a combination. In still other embodiments, computing device 1118 works in conjunction with one or more components of communication network 1114 or server 1102 to implement certain functionality described herein in a distributed or cooperative manner.

Computing device 1118 includes control circuitry 1128, display 1134 and input circuitry 1102. Control circuitry 1128 in turn includes transceiver circuitry 1162, storage 1138 and processing circuitry 1140. In some embodiments, computing device 1118 or control circuitry 1128 may be configured as media devices 402, 502, 600, or 712 of FIGS. 4, 5, 6, and 7, respectively. In some embodiments, display 1034 is optional.

Server 1102 includes control circuitry 1120 and storage 1124. Each of storages 1124, and 1138 may be an electronic storage device. As referred to herein, the phrase "user equipment device," "user equipment," "user device," "electronic device," "electronic equipment," "media equipment device," or "media device" should be understood to mean any device for processing the text string described above or accessing content, such as, without limitation, wearable devices with projected image reflection capability, such as a head-mounted display (HMD) (e.g., optical head-mounted display (OHMD)), electronic devices with computer vision features, such as augmented reality (AR), virtual reality (VR), extended reality (XR), or mixed reality (MR), portable hub computing packs, a television, a Smart TV, a set-top box, an integrated receiver decoder (IRD) for handling satellite television, a digital storage device, a digital media receiver (DMR), a digital media adapter (DMA), a streaming media device, a DVD player, a DVD recorder, a connected DVD, a local media server, a BLU-RAY player, a BLU-RAY recorder, a personal computer (PC), a laptop computer, a tablet computer, a WebTV box, a personal computer television (PC/TV), a PC media server, a PC media center, a hand-held computer, a stationary telephone, a personal digital assistant (PDA), a mobile telephone, a portable video player, a portable music player, a portable gaming machine, a smartphone, or any other television equipment, computing equipment, or wireless device, and/or combination of the same. In some embodiments, the user equipment device may have a front facing screen and a rear facing screen, multiple front screens, or multiple angled screens. In some embodiments, the user equipment device may have a front facing camera and/or a rear facing camera. On these user equipment devices, users may be able to navigate among and locate the same content available through a television. Consequently, a user interface in accordance with the present disclosure may be available on these devices, as well. The user interface may be for content available only through a television, for content available only through one or more of other types of user equipment devices, or for content available both through a television and one or more of the other types of user equipment devices. The user interfaces described herein may be provided as online applications (i.e., provided on a website), or as stand-alone applications or clients on user equipment devices. Various devices and platforms that may implement the present disclosure are described in more detail below.

Each storage 1124, 1138 may be used to store various types of content, metadata, and or other types of data. Non-volatile memory may also be used (e.g., to launch a boot-up routine and other instructions). Cloud-based storage may be used to supplement storages 1124, 1138 or instead of storages 1124, 1138. In some embodiments, control circuitry 1120 and/or 1128 executes instructions for an application stored in memory (e.g., storage 1124 and/or storage 1138). Specifically, control circuitry 1120 and/or 1128 may be instructed by the application to perform the functions discussed herein. In some implementations, any action performed by control circuitry 1120 and/or 1128 may be based on instructions received from the application. For example, the application may be implemented as software or a set of executable instructions that may be stored in storage 1124 and/or 1138 and executed by control circuitry 1120 and/or 1028. In some embodiments, the application may be a client/server application where only a client application resides on computing device 1118, and a server application resides on server 1102.

The application may be implemented using any suitable architecture. For example, it may be a stand-alone application wholly implemented on computing device 1118. In such an approach, instructions for the application are stored locally (e.g., in storage 1138), and data for use by the application is downloaded on a periodic basis (e.g., from an out-of-band feed, from an Internet resource, or using another suitable approach). Control circuitry 1128 may retrieve instructions for the application from storage 1138 and process the instructions to perform the functionality described herein. Based on the processed instructions, control circuitry 1128 may, for example, perform processes 500-900 in response to input received from input circuitry 1102 or from communication network 1114. For example, in response to receiving a query and/or voice input and/or text string, control circuitry 1128 may perform the steps of processes 500-900 or processes relative to various embodiments, such as the example of FIGS. 1-4.

In client/server-based embodiments, control circuitry 1128 may include communication circuitry suitable for communicating with an application server (e.g., server 1102) or other networks or servers. The instructions for carrying out the functionality described herein may be stored on the application server. Communication circuitry may include a cable modem, an Ethernet card, or a wireless modem for communication with other equipment, or any other suitable communication circuitry. Such communication may involve the Internet or any other suitable communication networks or paths (e.g., communication network 1114). In another example of a client/server-based application, control circuitry 1128 runs a web browser that interprets web pages provided by a remote server (e.g., server 1102). For example, the remote server may store the instructions for the application in a storage device. The remote server may process the stored instructions using circuitry (e.g., control circuitry 1128) and/or generate displays. Computing device 1118 may receive the displays generated by the remote server and may display the content of the displays locally via display 1134. This way, the processing of the instructions is performed remotely (e.g., by server 1102) while the resulting displays, such as the display windows described elsewhere herein, are provided locally on computing device 1118. Computing device 1118 may receive inputs from the user via input circuitry 1102 and transmit those inputs to the remote server for processing and generating the corresponding displays. Alternatively, computing device 1118 may receive inputs from the user via input circuitry 1102 and process and display the received inputs locally, by control circuitry 1128 and display 1134, respectively.

Server 1102 and computing device 1118 may transmit and receive content and data such as media content via communication network 1114. For example, server 1102 may be a media content provider and computing device 1118 may be a smart television configured to download media content, such as a Harry Potter episode, from server 1102. In some embodiments implementing computing device 1118 as a smart television, the smart television may media devices 328 or 428. Control circuitry 1120, 1128 may send and receive commands, requests, and other suitable data through communication network 1114 using transceiver circuitry 1160, 1162, respectively. Control circuitry 1120, 1128 may communicate directly with each other using transceiver circuitry 1160, 1162, respectively, avoiding communication network 1114.

It is understood that computing device 1018 is not limited to the embodiments and methods shown and described herein. In nonlimiting examples, computing device 1018 may be any device for processing the text string described herein or accessing content, such as, without limitation, wearable devices with projected image reflection capability, such as a head-mounted display (HMD) (e.g., optical head-mounted display (OHMD)), electronic devices with computer vision features, such as augmented reality (AR), virtual reality (VR), extended reality (XR), or mixed reality (MR), portable hub computing packs, a television, a Smart TV, a set-top box, an integrated receiver decoder (IRD) for handling satellite television, a digital storage device, a digital media receiver (DMR), a digital media adapter (DMA), a streaming media device, a DVD player, a DVD recorder, a connected DVD, a local media server, a BLU-RAY player, a BLU-RAY recorder, a personal computer (PC), a laptop computer, a tablet computer, a WebTV box, a personal computer television (PC/TV), a PC media server, a PC media center, a handheld computer, a stationary telephone, a personal digital assistant (PDA), a mobile telephone, a portable video player, a portable music player, a portable gaming machine, a smartphone, or any other device, computing equipment, or wireless device, and/or combination of the same capable of suitably operating a media content.

Control circuitry 1120 and/or 1118 may be based on any suitable processing circuitry such as processing circuitry 1126 and/or 1140, respectively. As referred to herein, processing circuitry should be understood to mean circuitry based on one or more microprocessors, microcontrollers, digital signal processors, programmable logic devices, field-programmable gate arrays (FPGAs), application-specific integrated circuits (ASICs), etc., and may include a multi-core processor (e.g., dual-core, quad-core, hexa-core, or any suitable number of cores). In some embodiments, processing circuitry may be distributed across multiple separate processors, for example, multiple of the same type of processors (e.g., two Intel Core i9 processors) or multiple different processors (e.g., an Intel Core i7 processor and an Intel Core i9 processor). In some embodiments, control circuitry 1120 and/or control circuitry 1118 are configured to implement an NLU system, such as systems, or parts thereof, that perform various query determination, query generation, and model training and operation processes described and shown in connection with FIGS. 1-9.

Computing device 1118 receives a user input 1104 at input circuitry 1102. For example, computing device 1118 may receive a text string, as previously discussed. In some embodiments, computing device 1118 is a media device (or player) configured as media devices 102, 104, 202, 204, 302, 304, 402, or 404, with the capability to receive voice, text, or a combination thereof. It is understood that computing device 1018 is not limited to the embodiments and methods shown and described herein. In nonlimiting examples, computing device 1018 may be, without limitation, wearable devices with projected image reflection capability, such as a head-mounted display (HMD) (e.g., optical head-mounted display (OHMD)), electronic devices with computer vision features, such as augmented reality (AR), virtual reality (VR), extended reality (XR), or mixed reality (MR), portable hub computing packs, a television, a Smart TV, a set-top box, an integrated receiver decoder (IRD) for handling satellite television, a digital storage device, a digital media receiver (DMR), a digital media adapter (DMA), a streaming media device, a DVD player, a DVD recorder, a connected DVD, a local media server, a BLU-RAY player, a BLU-RAY recorder, a personal computer (PC), a laptop computer, a tablet computer, a WebTV box, a personal computer television (PC/TV), a PC media server, a PC media center, a handheld computer, a stationary telephone, a personal digital assistant (PDA), a mobile telephone, a portable video player, a portable music player, a portable gaming machine, a smartphone, or any other television equipment, computing equipment, or wireless device, and/or combination of the same.

User input 1004 may be a voice input such as the voice input shown and described relative to FIGS. 1-4. In some embodiments, input circuitry 1102 may be a device, such as the devices of FIGS. 1-4. In some embodiments, input circuitry 1102 may be a receiver, such as the receivers of FIGS. 1-4. Transmission of user input 1104 to computing device 1118 may be accomplished using a wired connection, such as an audio cable, USB cable, ethernet cable or the like attached to a corresponding input port at local device 300, or may be accomplished using a wireless connection, such as Bluetooth, WIFI, WiMAX, GSM, UTMS, CDMA, TDMA, 3G, 4G, 4G, 5G, Li-Fi, LTE, or any other suitable wireless transmission protocol. Input circuitry 304 may comprise a physical input port such as a 3.5 mm audio jack, RCA audio jack, USB port, ethernet port, or any other suitable connection for receiving audio over a wired connection, or may comprise a wireless receiver configured to receive data via Bluetooth, WIFI, WiMAX, GSM, UTMS, CDMA, TDMA, 3G, 4G, 4G, 5G, Li-Fi, LTE, or other wireless transmission protocols.

Processing circuitry 1140 may receive input 1104 from input circuitry 1102. Processing circuitry 1140 may convert or translate the received user input 1104 that may be in the form of gestures or movement to digital signals. In some embodiments, input circuitry 1102 performs the translation to digital signals. In some embodiments, processing circuitry 1140 (or processing circuitry 1126, as the case may be) carry out disclosed processes and methods. For example, processing circuitry 1140 or processing circuitry 1126 may perform processes 500, 600, 700, 800 and 900 of FIGS. 5, 6, 7, 8 and 9, respectively.

The systems and processes discussed above are intended to be illustrative and not limiting. One skilled in the art would appreciate that the actions of the processes discussed herein may be omitted, modified, combined, and/or rearranged, and any additional actions may be performed without departing from the scope of the invention. More generally, the above disclosure is meant to be exemplary and not limiting. Only the claims that follow are meant to set bounds as to what the present disclosure includes. Furthermore, it should be noted that the features and limitations described in any one embodiment may be applied to any other embodiment herein, and flowcharts or examples relating to one embodiment may be combined with any other embodiment in a suitable manner, done in different orders, or done in parallel. In addition, the systems and methods described herein may be performed in real time. It should also be noted that the systems and/or methods described above may be applied to, or used in accordance with, other systems and/or methods.

What is claimed is:

1. A method of determining to perform an action of a query using a trained natural language model of a natural language understanding (NLU) system, the method comprising:
    receiving the query including at least a content entity with a text string, wherein the text string corresponds to a prescribed action;
    determining whether the text string corresponds to an audio input of a first group;
    in response to determining the text string corresponds to an audio input of a first group, determining whether the text string includes an obsequious expression;
    in response to determining the text string includes an obsequious expression:
        determining whether the obsequious expression describes the content entity; and
        in response to determining the obsequious expression describes the content entity, determining to not perform the prescribed action.

2. The method of claim 1, further comprising;
    in response to determining to not perform the prescribed action, generating an instructional message to transmit to an audio input originator, wherein the instruction message solicits a modified audio input that includes the content entity and an obsequious expression; and
    in response to generating the instructional message, causing transmitting one or more instructional message audio signals corresponding to the instructional message or waiting a time period to receive a response to the instructional message.

3. The method of claim 2, further comprising in response to receiving a response to the instructional message during the time period, determining whether the response includes the obsequious expression time period, wherein:
    in response to determining the response includes the obsequious expression of choice, determining to perform the prescribed action; and
    in response to determining the response does not include the obsequious expression of choice, determining to not perform the prescribed action.

4. The method of claim 1, wherein determining whether the text string corresponds to an audio input of a first group is based on one or more acoustic characteristics of one or more audio signals corresponding to the audio input.

5. The method of claim 1, further comprising transmitting the query to the natural language model to train the natural language model with the query.

6. The method of claim 1, wherein determining whether the text string includes an obsequious expression comprises comparing the obsequious expression to a list of stored obsequious expressions for a match.

7. The method of claim 1, wherein determining whether the obsequious expression describes the content entity comprises performing a natural language recognition process selected from a group of hidden Markov model, dynamic time warping, and artificial neural networks.

8. The method of claim 1, further comprising updating a database with the content entity or with the obsequious expression.

9. The method of claim 1, further comprising in response to determining the text string does not correspond to an audio input from a first group:
    determining whether the text string includes an obsequious expression; and
    in response to determining the text string includes an obsequious expression, determining whether the obsequious expression describes the content entity;
    in response to determining the obsequious expression describes the content entity, determining to not perform the prescribed action; and
    in response to determining the obsequious expression does not describe the content entity, determining to perform the prescribed action.

10. A system of determining to perform an action of a query using a trained natural language model of a natural language understanding (NLU) system, the system comprising:
    input circuitry configured to receive the query including at least a content entity with a text string, wherein the text string corresponds to a prescribed action;
    control circuitry configured to:
        determine whether the text string corresponds to an audio input of a first group;
        in response to determining the text string corresponds to an audio input of the first group, determine whether the text string includes an obsequious expression;
        in response to determining the text string includes an obsequious expression:
            determine whether the obsequious expression describes the content entity;
            in response to determining the obsequious expression does not describe the content entity, determine to perform the prescribed action; and
            in response to determining the obsequious expression describes the content entity, determine to not perform the prescribed action; and
        in response to determining the text string does not include the obsequious expression, determine to not perform the prescribed action.

11. The system of claim 10, wherein the control circuitry is further configured to:
    in response to determining to not perform the prescribed action, generate an instructional message to transmit to an originator of the audio input, wherein the instruction message solicits a modified audio input that includes the content entity and an obsequious expression; and
    in response to generating the instructional message, cause transmitting one or more instructional message audio signals corresponding to the instructional message or wait a time period to receive a response to the instructional message.

12. The system of claim 11, wherein the control circuitry is further configured to in response to receiving a response to the instructional message during the time period, determine whether the response includes the obsequious expression, wherein:
    in response to determining the response includes the obsequious expression, determining to perform the prescribed action; and
    in response to determining the response does not include the obsequious expression, determining to not perform the prescribed action.

13. The system of claim 10, wherein the control circuitry is further configured to determine whether the text string corresponds to an audio input of a first group based on an acoustic characteristic of one or more audio signals corresponding to the audio input.

14. The system of claim 10, wherein the control circuitry is further configured to transmit the query to the natural language model to train the natural language model with the query.

15. The system of claim 10, wherein determining whether the text string includes an obsequious expression, wherein the control circuitry is further configured to compare the obsequious expression to a list of stored obsequious expressions for a match.

16. The system of claim 10, wherein in determining whether the obsequious expression describes the content entity, the control circuitry is further configured to perform a natural language recognition process selected from a group of hidden Markov model, dynamic time warping, and artificial neural networks.

17. The system of claim 10, wherein the control circuitry is further configured to update a database with the content entity or with the obsequious expression.

18. The system of claim 10, wherein the control circuitry is further configured to in response to determining the text string does not correspond to an audio input of a first group:

determine whether the text string includes an obsequious expression; and in response to determining the text string includes an obsequious expression, determine whether the obsequious expression describes the content entity;

in response to determining the obsequious expression describes the content entity, determine to not perform the prescribed action; and in response to determining the obsequious expression does not describe the content entity, determine to perform the prescribed action.

19. The method of claim 1, further comprising:
in response to determining the obsequious expression does not describe the content entity, determining to perform the prescribed action.

20. The method of claim 1, further comprising:
in response to determining the text string does not include the obsequious expression, determining to not perform the prescribed action.

* * * * *